United States Patent [19]
Speckhart et al.

[11] Patent Number: 5,660,261
[45] Date of Patent: Aug. 26, 1997

[54] SINGLE LATCH LOADER AND METHOD FOR LOADING

[75] Inventors: Bernard S. Speckhart, Short Hills; Ramon R. Duterte, Jr., Lodi; Jose Lopes, Elizabeth, all of N.J.; Craig M. Davidson, Cardiff, Calif.

[73] Assignee: White Conveyors, Inc., Kenilworth, N.J.

[21] Appl. No.: 504,359

[22] Filed: Jul. 19, 1995

[51] Int. Cl.⁶ .................................................. B65G 37/00
[52] U.S. Cl. ........................................... 198/357; 198/358
[58] Field of Search ................... 198/358, 465.4, 198/357

[56] References Cited

U.S. PATENT DOCUMENTS

| Re. 24,961 | 4/1961 | Curtis ........................... 118/316 |
| 421,999 | 2/1890 | Williams. |
| 1,412,631 | 4/1922 | Righter. |
| 1,861,600 | 6/1932 | Harrison. |
| 1,998,109 | 4/1935 | Walter, Jr. ........................ 211/1.5 |
| 2,449,669 | 9/1948 | Pohlers ............................ 198/168 |
| 2,536,575 | 1/1951 | Seldin ............................. 198/168 |
| 2,573,334 | 10/1951 | Hitz ............................... 198/173 |
| 2,583,968 | 1/1952 | Rosseau ........................... 263/6 |

(List continued on next page.)

FOREIGN PATENT DOCUMENTS

| 334127 | 7/1933 | Canada. |
| 690778 | 7/1964 | Canada ........................... 186/11 |
| 726529 | 1/1966 | Canada ........................... 198/22 |
| 1018472 | 10/1977 | Canada ........................... 203/18 |
| 1018931 | 10/1977 | Canada ........................... 203/18 |
| 1140139 | 11/1962 | Germany. |
| 1205448 | 11/1965 | Germany. |
| 2525070 | 12/1976 | Germany. |
| 737325 | 6/1980 | U.S.S.R.. |
| 1221112 | 3/1986 | U.S.S.R.. |

OTHER PUBLICATIONS

Master–Veyor brochure, published by Speed Check Conveyor Co. Inc. Decatur, GA, pp. 1–4.
Sorting Carousel brochure, published by Dunnewolt U.S.A. Inc., Dallas, TX, pp. 1–4.
My–T–Veyor brochure, Model No. 830, published by My–T–Veyor, Oxford, MI, pp. 1–3.
Sort–O–Veyor brochure, published by Speed Check Conveyor Co. Inc. Decatur, GA, pp. 1–4.
Quick Assembly brochure, published by Natmar, Inc., Cincinatti, Ohio, pp. 1–2.
Controlling Hospital Garments, Wim Giezeman, Textile Rental, Jun. 1982, pp. 34–36, 38.

*Primary Examiner*—James R. Bidwell
*Attorney, Agent, or Firm*—Kenyon & Kenyon

[57] ABSTRACT

A high-speed loader loads garments onto a conveyor using two metering devices, each controlled by a computer. The second metering device is located closer to the conveyor than the first, holds only one hanger at a time and can easily be cleared to allow garments on the conveyor to pass unimpeded. The metering devices allow the computer to triple-buffer the hangers by dividing the loader into three distinct sections. The first buffer is located before the first metering device and can hold several garments physically far enough away from the conveyor to allow garments to pass. Hangers are released by the first metering device one at a time to a second buffer, which is between the first and second metering device. The second metering device is a simple air stop positioned close to the conveyor. The location of the second metering device minimizes the length and uncertainty of the transit time of the hanger from the loader to the conveyor. The third section of the loader is a load ramp that conveys the hanger from the second metering device directly to the conveyor, which third buffer also holds only one garment. The hanger on the load ramp is removed by the motion of the conveyor, at which time the second metering device will release the hanger in the secondary buffer to the load ramp. At this time, the first metering device releases a single hanger to the second metering device.

38 Claims, 11 Drawing Sheets

U.S. PATENT DOCUMENTS

| | | | |
|---|---|---|---|
| 2,599,615 | 6/1952 | Dahlberg | 198/213 |
| 2,645,186 | 7/1953 | Davis | 104/97 |
| 2,708,501 | 5/1955 | Boehm | 198/27 |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,868,354 | 1/1959 | Harrison | 198/177 |
| 2,899,072 | 8/1959 | Weiss | 211/1.5 |
| 2,916,132 | 12/1959 | Leiser | 198/21 |
| 2,918,164 | 12/1959 | Austin et al. | 198/177 |
| 2,947,407 | 8/1960 | Wood | 198/66 |
| 2,952,351 | 9/1960 | Stone | 198/177 |
| 2,987,170 | 6/1961 | Hamilton | 198/213 |
| 2,998,136 | 8/1961 | Gerisch | 209/81 |
| 3,008,562 | 11/1961 | Ohrnell | 198/26 |
| 3,017,025 | 1/1962 | Stephen | 209/81 |
| 3,090,481 | 5/1963 | Biel et al. | 198/221 |
| 3,113,659 | 12/1963 | Oda et al. | 198/25 |
| 3,124,236 | 3/1964 | Gerisch | 198/169 |
| 3,148,765 | 9/1964 | Weiss et al. | 198/213 |
| 3,151,730 | 10/1964 | Bünten | 198/38 |
| 3,152,682 | 10/1964 | Rutkovsky et al. | 198/38 |
| 3,164,245 | 1/1965 | Juengel | 198/129 |
| 3,171,536 | 3/1965 | Johnson | 198/465.4 |
| 3,178,012 | 4/1965 | Weiss et al. | 198/213 |
| 3,184,042 | 5/1965 | Rutkovsky et al. | 198/177 |
| 3,194,383 | 7/1965 | Kuwertz | 198/38 |
| 3,200,933 | 8/1965 | Schenk et al. | 198/38 |
| 3,247,952 | 4/1966 | Kozlosky | 198/173 |
| 3,403,767 | 10/1968 | Gerisch | 198/20 |
| 3,415,352 | 12/1968 | Gerisch | 198/38 |
| 3,422,950 | 1/1969 | Bachmann | 198/177 |
| 3,454,148 | 7/1969 | Harrison | 198/28 |
| 3,469,667 | 9/1969 | Gerisch | 193/40 |
| 3,511,359 | 5/1970 | Gerisch | 198/126 |
| 3,557,935 | 1/1971 | Gerisch | 198/38 |
| 3,580,378 | 5/1971 | Pedersen | 198/25 |
| 3,581,887 | 6/1971 | Radutsky et al. | 209/73 |
| 3,622,000 | 11/1971 | McClenny | 209/121 |
| 3,684,078 | 8/1972 | Nielsen | 198/33 |
| 3,707,925 | 1/1973 | Byrnes, Sr. | 104/167 |
| 3,780,852 | 12/1973 | Speckhart et al. | 198/181 |
| 3,786,911 | 1/1974 | Milazzo | 198/219 |
| 3,799,318 | 3/1974 | Dekoekkoek | 198/26 |
| 3,860,351 | 1/1975 | Weiss et al. | 403/218 |
| 3,917,112 | 11/1975 | Willis et al. | 221/1 |
| 3,942,340 | 3/1976 | Kirkby | 68/3 R |
| 3,961,699 | 6/1976 | Hirsch | 198/26 |
| 4,010,841 | 3/1977 | Bonzack | 198/357 |
| 4,018,327 | 4/1977 | Goodman et al. | 198/723 |
| 4,022,338 | 5/1977 | Laursen | 214/89 |
| 4,027,598 | 6/1977 | Swilley | 104/162 |
| 4,036,365 | 7/1977 | Rosenfeld | 209/73 |
| 4,180,152 | 12/1979 | Sefcik | 198/377 |
| 4,214,663 | 7/1980 | Schopp et al. | 209/552 |
| 4,239,435 | 12/1980 | Weiss et al. | 414/136 |
| 4,303,503 | 12/1981 | de Mimerand et al. | 209/3.3 |
| 4,763,773 | 8/1988 | Kawarabashi et al. | 198/409 |
| 4,792,033 | 12/1988 | Iwata et al. | 198/357 |
| 4,817,778 | 4/1989 | Davidson | 198/346.1 |
| 4,875,416 | 10/1989 | Duce | 104/167 |
| 4,903,819 | 2/1990 | Heinold et al. | 198/465.4 |
| 4,907,699 | 3/1990 | Butcher et al. | 209/3.3 |
| 4,943,198 | 7/1990 | McCabe | 414/13 |
| 4,961,488 | 10/1990 | Steeghs | 198/357 |
| 4,977,996 | 12/1990 | Duce | 198/349.95 |
| 4,991,719 | 2/1991 | Butcher et al. | 209/3.3 |
| 4,995,531 | 2/1991 | Summers | 221/75 |
| 5,000,309 | 3/1991 | Dooley | 198/680 |
| 5,005,691 | 4/1991 | Jennewein et al. | 198/465 |
| 5,094,337 | 3/1992 | van Veldhuisen et al. | 198/357 |
| 5,113,995 | 5/1992 | Sskurai | 198/409 |
| 5,141,094 | 8/1992 | Speckhart et al. | 198/349 |
| 5,143,201 | 9/1992 | Speckhart et al. | 198/502.3 |
| 5,154,275 | 10/1992 | Speckhart et al. | 198/416 |
| 5,193,686 | 3/1993 | Speckhart et al. | 209/3.3 |
| 5,220,511 | 6/1993 | Speckhart et al. | 364/478 |
| 5,269,402 | 12/1993 | Speckhart et al. | 198/416 |
| 5,299,134 | 3/1994 | Speckhart et al. | 364/478 |
| 5,351,803 | 10/1994 | Speckhart et al. | 198/464.3 |
| 5,366,064 | 11/1994 | Gamberini et al. | 198/471.1 X |
| 5,451,234 | 9/1995 | Wassermann | 606/203 |

SINGLE LATCH LOADER AND METHOD FOR LOADING

FIELD OF THE INVENTION

The present invention relates generally to an apparatus and method for conveying articles and, more particularly, to an apparatus and method for conveying articles supported on hooked members, such as garments supported on hangers in laundry and dry cleaning facilities.

BACKGROUND INFORMATION

An apparatus for conveying articles of clothing supported on hangers is shown in U.S. Pat. No. 4,239,435, dated Dec. 16, 1980, to Weiss et al. (the disclosure of which is hereby incorporated by reference), which discloses a sorting conveyor used to sort articles of clothing for delivery to customers. The sorting conveyor is made up of an endless chain with a plurality of carrier assemblies. Each carrier assembly includes several latch receptacles having a releasable latch mechanism adapted to support the hooked end of a hanger within the receptacle. The articles of clothing are sorted after being placed on the conveyor line by engaging the hooked end of each hanger in a latch receptacle of a carrier assembly.

In order to load hangers onto the conveyor, a single hanger must be placed on a loading ramp which raises the hanger into the carrier latch as the carrier moves into the proper receiving position by the loading ramp. Each hanger must be presented to the load ramp at a rate comparable to the arrival rate of available locations on the conveyor. The conveyor can move at a rate up to one hundred (100) feet per minute (FPM).

Since the garments on the hangers are to be sorted, and have been identified in a queue before being presented to the loader, the loader must be able to track the hangers and unambiguously identify a hanger and the corresponding conveyor location where it is latched.

To allow the use of multiple loaders, when the loader has paused, garments on the loader must not interfere with garments already on the conveyor. To prevent this interference, one solution is to provide a single hanger metering device, known as a "Singulator," to present one hanger to the loading ramp for each carrier assembly. For a typical carrier assembly length of one foot, this would require one garment to be released to the load ramp every 0.6 seconds. This release must be synchronized with the conveyor movement. Placing a hanger metering device such as the Singulator far enough away from the conveyor to allow garments to pass induces a large amount of uncertainty in the transit time of garments from the metering device to the load ramp, interfering with the synchronization of the hanger release with the arrival of available locations on the conveyor. Further, the expected slide time of a hanger with a garment is in excess of the 0.6 seconds required to fill every conveyor location. This introduces unwanted inefficiency into the loading process, as available conveyor locations arrive and pass too quickly to fill. In other words, the use of a single hanger metering device with a positive feedback upon successful insertion of the hanger into a carrier would make it impossible to load every conveyor location.

In addition, previous loaders require operator involvement to load garments into empty carrier positions. Other types require an upward moving part to load the hanger into the empty carrier. Both of these types of loaders introduce inefficiencies into the process. Coordinating two different moving parts (i.e., the conveyor and the loader) so that they arrive in the same place at the same time is a much more complex problem than simply controlling the movement of a single part, i.e., the conveyor. One solution requires stopping movement of the conveyor while the loader is moved upward. In addition to the inefficiency of pausing, the continual stopping and starting of the conveyor places an unnecessary strain on the mechanical system.

The present invention is therefore directed to the problem of developing a method and apparatus of the type mentioned at the outset in which every available conveyor location can be filled with a hanger during the loading process yet which does not impact the conveyor rate. The present invention is also directed to the problem of developing an apparatus for loading hangers on empty carriers passing the loader without requiring operator involvement, without requiring a moving loader, and without requiring the conveyor to pause while passing the loader.

SUMMARY OF THE INVENTION

The present invention solves the first problem by providing a computer-controlled single latch loading device for loading garments onto a sorting conveyor at a high rate of speed. The apparatus of the present invention includes a primary metering device as well as a secondary metering device, each of which are under control of a computer. The interaction of the two metering devices permits the loader to load each empty carrier position as it passes the loader, yet prevents interference with garments already loaded on the conveyor.

According to the present invention, the secondary metering device is a simple, hanger metering device located much closer to the conveyor than the primary metering device. The secondary metering device holds only one hanger at a time and can be easily cleared to allow garments on the conveyor to pass unimpeded. This secondary hanger metering device allows the computer control system to triple-buffer the hangers by dividing the loader into three distinct sections.

The first section of the loader occurs before the primary hanger metering device, or Singulator. This is a buffer area (or queue) which can hold a number of garments physically located far enough from the conveyor to allow garments to pass on the conveyor unimpeded by the queued garments. The hangers which are presented to the primary metering device are released one at a time to a second buffer.

The second section of the loader (the second buffer) is the area on the loader between the primary hanger metering device (the Singulator) and the secondary hanger metering device. This buffer can hold a single hanger. The secondary hanger metering device is a simple air cylinder or air stop positioned close to the conveyor. The location of the secondary hanger metering device minimizes the length and uncertainty of the transit time of the hanger from the loader to the conveyor.

The third section of the loader (a third buffer) is a load ramp that conveys the hanger from the secondary buffer via the secondary metering device directly to the conveyor. The third buffer also holds only one garment.

According to the method of the present invention, the loader operates with a small number of hangers in the first buffer, ready to be released by the primary hanger metering device, a single hanger in the second buffer and a single hanger on the load ramp. As the hanger on the load ramp is removed by the motion of the conveyor, the secondary hanger metering device will release the hanger in the secondary buffer to the load ramp. At this time, the primary hanger metering device releases a single hanger to the secondary buffer and secondary metering device.

The computer control system of the present invention ensures that one and only one hanger is between the primary and secondary hanger metering devices, and that one and only one hanger is on the load ramp. The control system calculates and tracks the conveyor position relative to the loader to determine where on the conveyor a hanger was placed, and ensures that the hanger reaches the load ramp synchronized with the conveyor position. In the event that loading is paused, the control system will ensure that the conveyor path is clear to allow garments on the conveyor to pass unimpeded. It will automatically pause loading when garments already loaded on the conveyor approach the loader, and handle error conditions including the misfire of the primary hanger metering device.

One possible embodiment of the apparatus according to the present invention provides a loader on which the hangers travel via gravity from a queuing location to the conveyor. In this case, the primary metering device is mounted on the loader. The primary metering device selects one hanger at a time from the queue of hangers and releases the selected hanger at a first predetermined time so that the one selected hanger travels on the loader to the conveyor. The secondary metering device is mounted on the loader between the primary metering device and the conveyor. The secondary metering device blocks the selected hanger from traveling on the loader to the conveyor, and releases the selected hanger at a second predetermined time so that the selected hanger travels on the loader to the conveyor.

The above apparatus also includes a controller coupled to the primary and secondary metering devices. The controller coordinates operations of the primary and secondary metering devices so that the secondary metering device releases a first hanger to the conveyor as a second hanger passes from the primary metering device to the secondary metering device, while yet a third hanger passes into the primary metering device, and then the secondary metering device blocks access to the conveying device before the second hanger reaches the secondary metering device.

One possible embodiment of the loader of the present invention is a tube with a slot where the primary metering device is mounted. The tube is mounted at an angle so that hangers can slide down the tube. In this case, the primary metering device includes a spring-loaded cam disposed in the tube which extends through the slot in the tube and a first air cylinder which in one position extends to contact the cam forcing the cam into the slot, and in another position retracts which allows the cam to jut outside the tube.

In the above mentioned case, one possible embodiment of the secondary metering device is a second air cylinder which in a first position extends and contacts the tube and in a second position retracts.

One advantageous implementation of the embodiment of the present invention provides that a common air solenoid is used for both the first and second air cylinders and that the first and second air cylinders work in reciprocal fashion off the common air solenoid. This greatly simplifies the design of the loader.

The apparatus according to the present invention also provides a loader arm that is extendable from the loader to the conveyor, wherein the loader arm in one position extends to permit a hanger to travel from the loader to the conveyor and in another position retracts to permit articles traveling on the conveyor to pass by loader unimpeded. In this embodiment, the loader arm is controlled by yet another air cylinder.

The apparatus according to the present invention also provides that the primary metering device includes a means for selecting one hanger from the queue of hangers. This permits the one selected hanger to be released at the appropriate time in the loading cycle. One possible implementation of the means for selecting is a combination of an air cylinder and a cam, in which the air cylinder extends to contact the cam, which allows one hanger to travel past the cam to the first air cylinder. By providing that the air cylinder contact the cam at some point in the cam so that only one hanger can travel past the edge of the cam, one and only one hanger is selected at a time. By adjusting the point at which the air cylinder contacts the cam, hangers of different widths can easily be accommodated.

Another advantageous embodiment of the present invention provides that the primary metering device also includes a means for releasing a selected hooked member. When the means for selecting is as described in the paragraph directly above, the means for releasing can be implemented by simply retracting the air cylinder which permits the selected hanger to travel on the loader.

Another advantageous feature of the present invention is that several sensors are used to determine the status of the apparatus. A first sensor senses a hanger entering the primary metering device. A second sensor senses a hanger entering the secondary metering device. And, a third sensor senses a hanger exiting the load ramp onto the conveyor. Furthermore, the first, second and third sensors are coupled to the master controller, which permits the master controller to determine the exact status of each loader at any time.

Another advantageous feature of the apparatus according to the present invention is that a conveyor sensor is provided, which sensor senses the position of the conveyor as it passes the conveyor sensor. This conveyor sensor is also coupled to the master controller. A conveyor map stores data that indicates which positions on the conveyor are full and which are empty. In this case, the controller controls the primary and secondary metering devices so that hangers are in place in the primary and secondary metering devices when empty locations on the conveyor pass the loader, which ensures that each empty location is loaded with a hanger.

Another advantageous implementation of the present invention provides that the controller controls the primary and secondary metering devices so that when articles on the conveyor pass the loader, garments are not located in places on the loader that would interfere with the articles as they pass the loader.

Another advantageous feature of the apparatus according to the present invention provides that a debounce timer is coupled to the first, second and third sensors. The debounce timer clocks an interval during which outputs from the first, second and third sensors are inhibited to prevent false sensing indications due to vibrations by moving articles.

To solve the problem of preventing operator involvement, while not introducing another moving part, the present invention provides that a load ramp is disposed in the path of the conveyor. The load ramp is in contact with the loader arm when the loader arm is extended from the loader, so that the load ramp can receive a hanger released from the loader by the secondary metering device. The shape of the load ramp orients the hanger to be in line with other hangers carried by the conveyor and holds the hanger until a carrier from the conveyor picks it up.

One embodiment of the load ramp discussed for facilitating the transfer of a hanger to a carrier having a spring loaded latch includes a plate having a pair of spaced apart fin portions defining a gap therebetween and also defining a notch for the receipt of a hooked member, a loader rail spaced from the notch of the plate, and a selectively extendable loader arm coaxial with the loader rail, in which the loader rail and the loader arm, when extended, together define a path for the passage of a hanger leading to the notch, wherein a shape of the fins in combination with a juxtaposition of the loader arm with respect to the fins is such that as a hooked member slides down the loader arm and makes contact with the fins, and the hooked member rotates as it moves from the loader arm to a resting position in the notch of the fins.

An advantageous implementation of the load ramp occurs when one of the fins has an arcuate edge to facilitate the orientation and transfer of the hooked member onto the notch.

Another advantageous implementation of the load ramp occurs when the fins define a ramp adjacent the notch.

Another advantageous implementation of the load ramp occurs when the carrier has a spring-loaded slot for receipt of a hanger and a depending pusher projecting below the slot of the carrier.

Another advantageous implementation of the load ramp occurs when the pusher has a thickness that is less than the gap defined by the two fins so that at least a portion of the pusher can project into the gap defined by the two slots.

Another advantageous implementation of the load ramp occurs when the pusher has a ramp so that when a hooked member is located in the notch defined by the fins, and movement of the carrier through the gap between the fins causes the hooked member to ride up along the ramp of the pusher into the slot of the carrier to the extent that it engages the latch and is thereby secured to the carrier.

Another embodiment of the load ramp includes a plate having a pair of spaced apart fin portions defining a gap therebetween and also defining a notch for the receipt of a hooked member, one of the fins having an arcuate edge to facilitate the orientation and transfer of a hooked member onto the notch, and a ramp adjacent the notch.

According to a method of the present invention, the present invention provides that one article is selected at a time from a plurality of articles, that the one article is released at a first predetermined time for loading on the conveyor, that further access by the one article to the conveyor is blocked at the first predetermined time, and that the one article is released to the conveyor at a second predetermined time.

An advantageous implementation of the method according to the present invention provides that a second article is selected from the plurality of articles at the second predetermined time.

Another advantageous implementation of the method according to the present invention provides that a presence or absence of hangers on the carriers on the conveyor is determined, that a loader disposed near the conveyor preloads the loader with a hanger so that when an empty location approaches the loader, the hanger is ready for loading on the conveyor, and that loading of the loader with a hanger is inhibited when a location occupied with an article approaches the loader so that the movement of the article is not impeded by a hanger.

Another advantageous implementation of the method according to the present invention provides that an occupied status of the conveyor is stored, that the absence or presence of hangers sensed earlier is checked to determine whether it agrees with the occupied status stored, and that the occupied status of the conveyor is updated when either a discrepancy is determined or a hooked article is loaded.

Another advantageous implementation of the method according to the present invention provides that an article is dropped from the loader when it appears the article will interfere with an article on the conveyor, and that information regarding the article that was dropped is stored. By choosing between the lesser of two evils, dropping the garment prevents serious problems from occurring between the loader and the conveyor.

Another method according to the present invention provides that a plurality of articles are maintained in a first buffer located at a distance from the moving carrier sufficient to prevent interference between the plurality of articles and articles already loaded on the moving carrier, that one of the plurality of articles is released into a second buffer from the first buffer when an empty location on the carrier is determined, and that the one of the plurality of articles is released to a third buffer for loading in synchronization with a passing empty carrier.

An advantageous implementation of this method according to the present invention provides that whether at least the next two carriers on the conveyor approaching a loader are occupied with garments or not is determined, that the primary metering device is monitored to determine if a garment is available for loading, and that a first garment is released from the primary metering device down the loader and then immediately any remaining garments are blocked when a garment is available for loading, the conveyor status is not full or very full and no garments are in the loader. In this case, the conveyor status is full whenever the first of the next two carriers is vacant and the second of the next two carriers is occupied and the conveyor status is very full when both the first and second of the next two carriers are occupied.

Another advantageous implementation of this method according to the present invention provides that the first garment is blocked at a secondary metering device until an empty carrier approaches, that a load window timer is initiated when data from the plurality of sensors indicates a garment located at the secondary metering device will correctly load on an upcoming empty carrier, that the first garment is released from the secondary metering device when the load window time expires, that the primary metering device is turned on to select the first garment for loading and to hold the first garment in the primary metering device when the conveyor status is full, and that any garment in the secondary metering device is released when the conveyor status is full while simultaneously holding the first garment in the primary metering device.

Another method according to the present invention provides that empty conveyor positions approaching the loader are determined, that the loader is preloaded with an article for each empty conveyor position approaching the loader, and that loading of the loader is inhibited when occupied conveyor positions approach the loader.

DETAILED DESCRIPTION

Aspects of the design of conveyor systems, including sorting techniques, conveyor structure, and apparatus for loading and unloading articles onto and off of each conveyor are presented in the following U.S. patents assigned to the assignee of the instant invention. The entire contents of each of these patents is hereby expressly incorporated by reference herein, particularly for the aspects noted: U.S. Pat. No. 5,141,094, which teaches an apparatus for unloading articles; U.S. Pat. No. 4,239,435, which provides teachings pertaining to the distribution of a randomly assorted group of articles; U.S. Pat. No. 5,143,201, which teaches a carrier assembly; U.S. Pat. No. 5,351,803, which teaches a device and method for retrieving articles; U.S. Pat. No. 5,269,402, which teaches a conveyor; U.S. Pat. No. 5,299,134, which teaches a computer control system; U.S. Pat. No. 5,193,686, which teaches an article loading apparatus; U.S. Pat. No. 5,154,275, which teaches a conveyor; and U.S. Pat. No. 5,220,511, which teaches a computer control system for sorting articles.

The conveyor system with a computer controlled first sort conveyor can be implemented in accordance with the co-pending U.S. patent application entitled "Conveyor System with a Computer Controlled First Sort Conveyor," filed on even date herewith and assigned in common with the present application to White Conveyors Inc. of Kenilworth, N.J., and which is hereby incorporated by reference as if set forth fully herein.

The first sort conveyor may place sorted batches of garments onto one or more holding rails coupled to the first sort conveyor. The holding rails can be implemented in accordance with the co-pending U.S. patent application entitled "Powered Storage Rail for Transporting Articles", filed on even date herewith and being assigned in common with the present application to White Conveyors Inc. of Kenilworth, N.J., and which is hereby incorporated by reference as if set forth fully herein.

Batches of garments on the holding rails are transported via a transfer conveyor to the one or more final sort conveyors. The transfer conveyor can be implemented in accordance with the "Powered Storage Rail for Transporting Articles" application mentioned above or with a "Contin-U-Veyor" conveyor, for example, manufactured by White Conveyors Inc. of Kenilworth, N. J. The final Sort conveyors can be, for example, 5-latch "COMP-U-SORT" conveyors manufactured by White Conveyors Inc. of Kenilworth, N.J. and described in U.S. Pat. No. 5,143,201, entitled "Carrier Assembly," and U.S. Pat. No. 5,220,511, entitled "Computer Control System and Method for Sorting Articles on a Conveyor", both assigned in common with the present application to White Conveyors Inc. of Kenilworth, N.J., and being hereby incorporated by reference as if set forth fully herein.

SORT CONTROL

Figure 1:
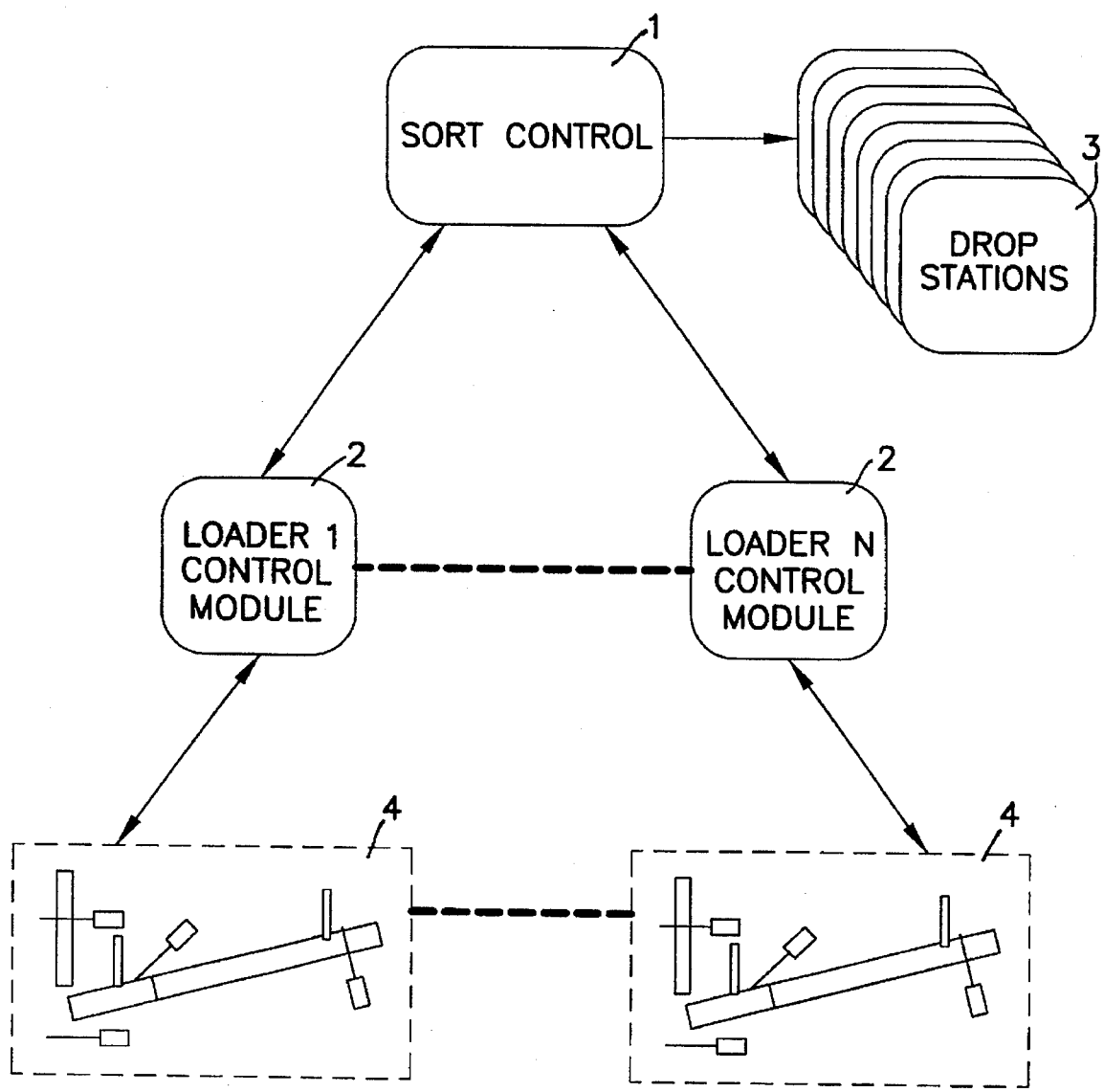
FIG. 1 depicts the data flow of an exemplary embodiment of the software processes that control the loader.

The sorting system is controlled through a single code module shown in FIG. 1, the sort control module 1. The sort control module 1 represents a software module running on a computer 33 (see FIG. 2). Each physical loader 4 (shown in FIG. 2) is controlled by a loader control module 2. The sort control module 1 sends commands to turn the loaders 4 on and off, informs the loader control modules 2 of system status, and allocates the loaded garments to drop stations 3. Each loader control module 2 controls the operation of a respective loader 4 and informs the sort control module 1 when a garment is successfully loaded. The computer 33 receives inputs from all of the sensors (see FIG. 2) depicted herein, and sends control signals to the loaders 4, which operate under control of the loader control module 2. The loader control module 2 is likewise a software program executing on a processor or computer.

CONTROLLER

Figure 2:
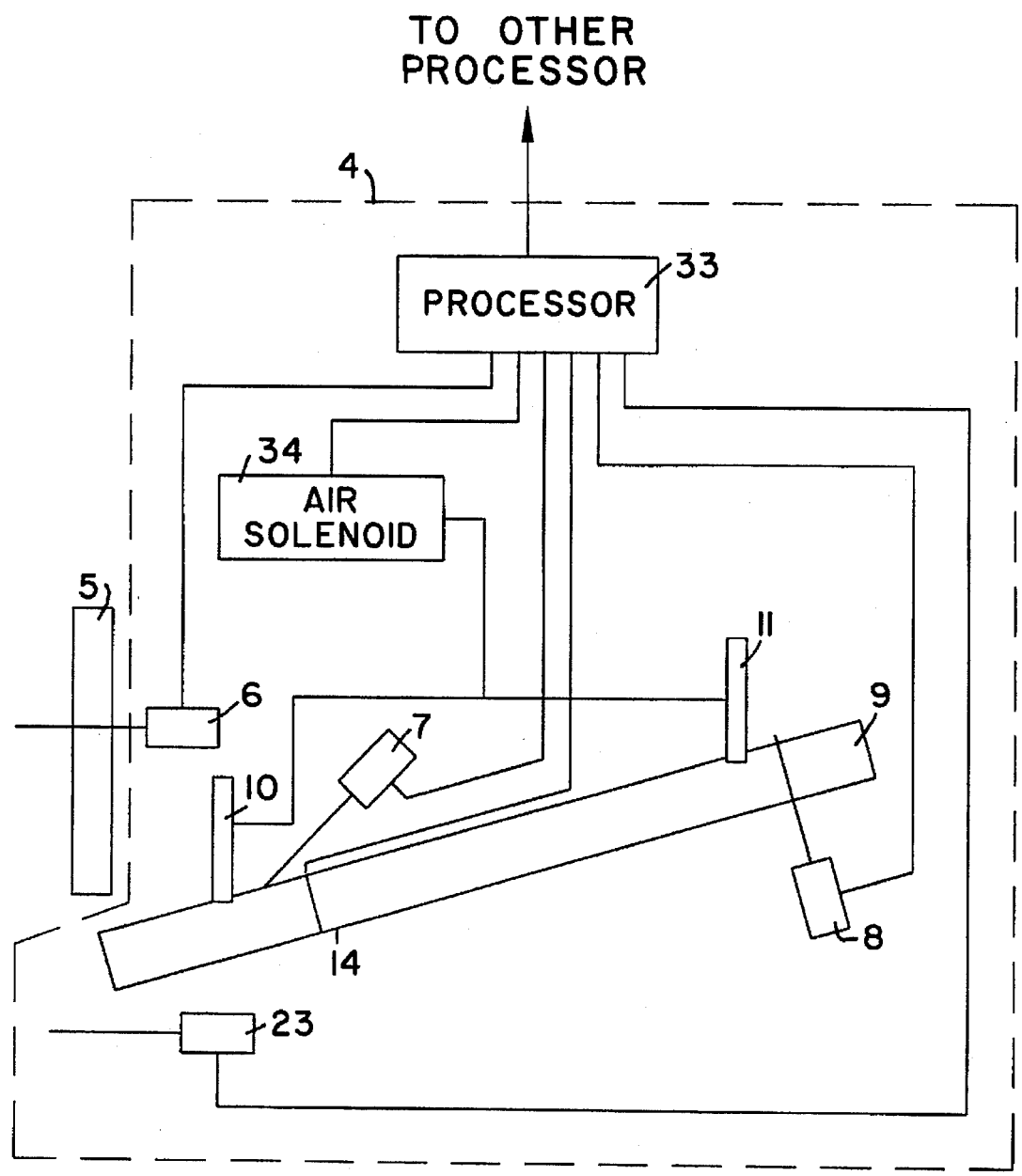
FIG. 2 depicts in block diagram format an embodiment of one of the loaders depicted in FIG. 1 according to the present invention.

The controller comprises either a single computer 33 attached to all of the loaders 4 and sensors 6, 7, 8 and 23 for each loader 4, or it can be a distributed processor. That is, a processor 33 can be dedicated to each of the loaders 4 (as shown in FIG. 2) and then interconnected to each other via a master processor, which shares information regarding the status of the conveyor 5, e.g., which positions are occupied and which are empty. In the alternative, each processor could be coupled to one of the other processors, thus linking all of the processors together. In any case, the computer 33 must maintain a map of the conveyor 5 in memory, which is updated each time a loader 4 loads a garment on the conveyor 5.

As stated above, the computer 33 could also be a dedicated microprocessor or digital signal processor. Another possible embodiment of the computer 33 is a PC type computer with an expansion card for permitting connection to the PC from several sensors, i.e., at least six signals must be coupled to the computer 33 for each loader 4.

The computer 33 (see FIG. 2) receives status signals from the sensors 6, 7, 8 and 23 and controls the primary and secondary metering devices 11 and 10 via the air solenoid 34. In addition, the computer 33 controls the air cylinder 14 for extending and retracting the loader arm 15.

LOADER

Figure 3:
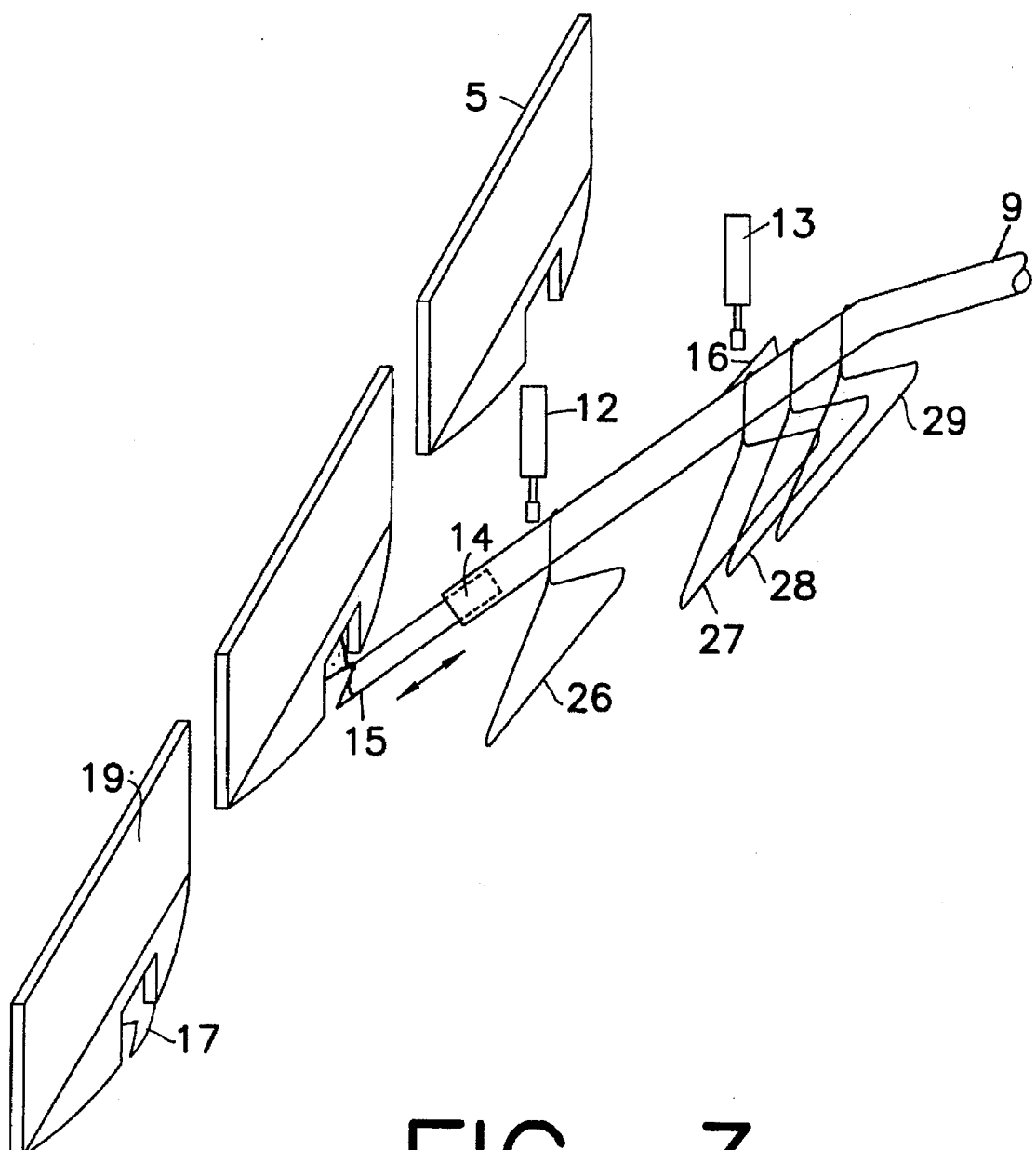
FIG. 3 depicts the loader shown in FIG. 2 during operation.

The conveyor 5 (see FIG. 2) has several loaders 4 in position to load garments on the carriers 19 on the conveyor 5 (see FIG. 3). Each loader 4 is capable of loading every empty conveyor carrier 19 that passes the loader, as long as there remain garments available for loading in the queue. Each loader 4 is capable of loading 6000 pre-scanned garments per hour. Each loader 4 is self-aligning; no configuration is needed when a loader 4 is installed or moved. Any number of loaders 4 may be used on a single conveyor 5 (see FIG. 2).

FIG. 2 presents an exemplary embodiment of the loader 4 of the present invention. The loader 4 comprises a loader rail 9 along which hangers slide via gravity to the conveyor 5. The loader rail 9 is mounted at an angle of about 30°–45°. The loader 4 has two metering devices 10, and 11, which control the timing of the hangers passing on the loader rail 9. A plurality of sensors 6, 7, 8 and 23 monitor the status of the loader 4, the position of hangers on the loader 4, and the status and position of the conveyor 5. Sensor data is transmitted to the loader control module 2, which shares the data with the sort control module 1 running on the computer 33 or processor. As stated above, the computer 33 could also be a dedicated microprocessor. One possible embodiment of the computer 33 is a PC based computer with an expansion card for permitting connection to the PC from several sensors, e.g., at least six signals must be coupled to the computer 33 for each loader 4. If the computer 33 is a distributed computer, i.e., it is made up of several processors, then each processor 33 forms part of the loader 4.

SENSORS

As the conveyor 5 carries garments past the loader 4, the retroreflective, polarized conveyor position sensor 6 detects windows 24 (see FIG. 10) in the conveyor carriers 19 (see FIG. 3) to determine the conveyor position relative to the loader 4. The conveyor position sensor 6 passes on a signal to the computer 33 indicating the detection of each window 24 as it passes the conveyor position sensor 6.

The photo proximity garment staged sensor 7 detects a hanger passing on the loader 4, and passes this information to the computer 33. The garment queued sensor 8, preferably a whisker switch or photo switch, determines if garments are queued at the primary metering device 11 and also transmits this information to the computer 33.

As depicted in FIG. 2, the conveyor position sensor 6 is disposed directly before the loader 4 on the conveyor 5 line. The conveyor position sensor 6 must be located close enough to the loader 4 to ensure proper timing due to variances in the speed of the conveyor 5. Consequently, by the time the conveyor sensor 6 senses an approaching carrier, the loader 4 cannot preload its garments in position in time for loading on the upcoming carrier. The loader 4 must preload the garments in position for loading before the conveyor sensor 6 detects an approaching carrier. Therefore, another sensor must detect that an empty carrier is approaching the loader 4 well before the empty carrier reaches the loader 4 to allow the loader 4 to preload its garments. The proximity garment loaded sensor 23 performs this function. The proximity garment loaded sensor 23, preferably a photo switch, detects a garment on a hanger as it exits the load ramp 18 (See FIGS. 11a–d), by means of which the garment is loaded onto the conveyor 5, and sends this information to the computer 33. The proximity garment sensor 23 thus indicates the successful loading of a garment on the conveyor 5. In addition, the proximity garment sensor 23 can indicate a passing empty carrier position to the computer 33, so that the next loader 4 on the system can preload its garments in time to be ready to load in that upcoming empty position. The garment sensor 23 is disposed below the carrier so that an empty carrier will pass the sensor without being detected, whereas a carrier with a garment will interrupt the light causing the sensor 23 to output a signal indicative of a sensed garment.

SECONDARY METERING DEVICE

The loader 4 has two metering devices 10 and 11 for releasing hangers during the loading process, a secondary hanger metering device 10 located proximally to the conveyor 5 and a primary hanger metering device 11 located distally to the conveyor 5. These two metering devices 10 and 11 operate under the control of the computer 33.

The secondary hanger metering device 10 comprises a secondary air cylinder 12, which holds one garment when it extends and releases one garment when it retracts. As shown in FIG. 3, when the secondary air cylinder 12 extends, it contacts the loader rail 9, one possible embodiment of which is simply a tube along which the hangers 26–29 slide due to gravity. When the secondary air cylinder 12 retracts, the hanger 26 will slide unimpeded down the loader rail or tube 9, down the load arm 15 to the load ramp 18 (see FIGS. 11a–d).

PRIMARY METERING DEVICE

The primary hanger metering device 11 comprises a primary air cylinder 13 (FIG. 3) and a spring-loaded cam 16, which interact to hold one garment (or hanger) 27 when the primary air cylinder 13 extends and releases one garment 27 when the primary air cylinder 13 retracts. To do so, the primary air cylinder 13 extends and pushes against the cam 16, which is a spring-loaded cam 16 that extends in and out of the loader rail or tube 9. The spring (not shown) maintains the cam 16 in the up position, i.e., extending out of the tube 9. When the cam 16 is in the up position and the cylinder 11 is retracted, hangers 27–29 are prevented from sliding down the loader rail 9, as shown in FIG. 3. When the primary air cylinder 13 extends, it contacts the cam 16 and forces the cam 16 into the loader rail or tube 9. This permits one hanger 27 to slide down the tube 9 and contact the primary air cylinder 13. The point at which the primary air cylinder 13 contacts the cam 16 is adjustable for different diameter hangers so that only one hanger can slide past the edge of the cam 16. Then, the primary air cylinder 13 retracts allowing the first hanger 27 to continue sliding down the loader rail 9 and enabling the spring action of the cam 16 to force the cam 16 to extend out of the tube 9. This prevents a second hanger 28 from sliding past the edge of the cam 16. By quickly extending and retracting the primary air cylinder 13 in interaction with the cam 16, only one hanger 26 at a time enters the portion of the loader rail 9 between the primary air cylinder 13 and the secondary air cylinder 12.

The air cylinders 12 and 13 are connected to the same air solenoid 34 (see FIG. 2) and preferably work together in a reciprocal fashion, i.e., when one is retracted the other is extended. This permits the use of a single air solenoid. When cylinder 12 extends, cylinder 13 retracts. When cylinder 12 retracts, cylinder 13 extends. Thus, the retraction of cylinder 12 releases a hanger 26 from the secondary hanger metering device 10 while simultaneously allowing a hanger 27 to pass into the primary metering device 11, i.e., one hanger 27 passes from the edge of the cam 16 to the primary air cylinder 13 where it waits until the primary air cylinder 13 is retracted. Cylinder 12 then extends to block the hanger path as cylinder 13 retracts to allow the hanger 27 to pass through the primary metering device 11. Since there is a non-zero transit time for the hanger 27 to slide from the primary hanger metering device 11 to the secondary hanger metering device 10, the hanger path is always blocked before the hanger 27 released from the primary metering device 11 reaches the secondary hanger metering device 10. That is, the travel time for the hanger 27 to travel from the primary metering device 11 to the secondary metering device 10 is longer than the time it takes the secondary air cylinder 12 to move from its retracted position to its extended position.

LOAD EXTENSION ARM

Referring to FIGS. 11a–11d, the load arm extension cylinder 14 (see FIG. 3) extends the load arm 15 to allow loading of garments and retracts the load arm 15 to allow garments on the conveyor 5 to pass. When the load arm 15 is extended, the load arm 15 rests against the load ramp 18. A garment slides from the secondary metering device 10, down the load arm 15 to the load ramp 18. The hanger 25 then rests on the load ramp 18 until the carrier 19 on the conveyor 5 passes by the load ramp 18 and picks up the hanger 25.

LOAD RAMP

The load ramp 18 is a piece of formed metal which is mounted below the conveyor 5. The purpose of the load ramp 18 is to force the garments into the latch 17 of the carriers 19 on the conveyor 5 as they pass. The shape of the load ramp 18 is critical in performing this function. The load ramp 18 is depicted in FIGS. 11a–11d.

Figure 11A:
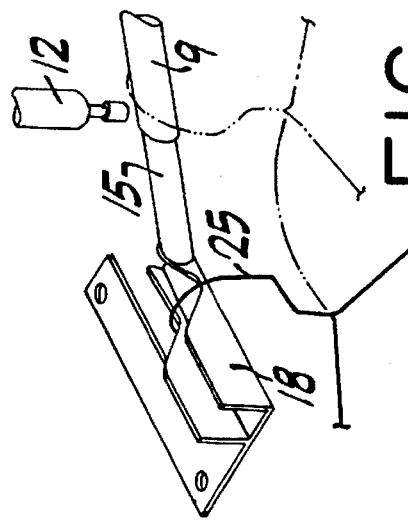
FIGS. 11a through 11d depict one possible embodiment of the load arm and the loader ramp as they interact with the carrier on the conveyor.
Figure 11B:
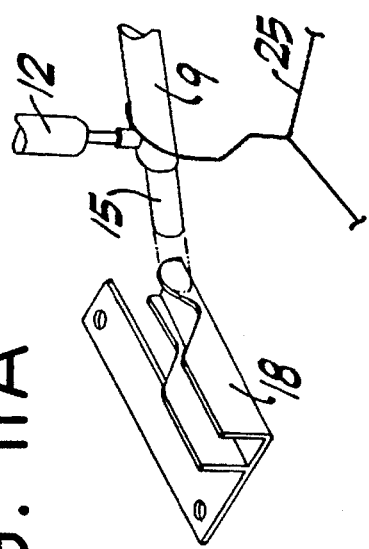

The load ramp 18 is shaped so that the hanger 25 released from the secondary metering device 10 slides down the load arm 15 onto the load ramp 18 and rotates as shown in FIG. 11b. The curved shape of the load ramp 18 at the point at which the load arm 15 contacts the load ramp 18 guides the hanger into the base (or valley) of the load ramp 18 and causes the hanger 25 to rotate into a position parallel to the hangers already loaded on other carriers on the conveyor 5.

Figure 11C:
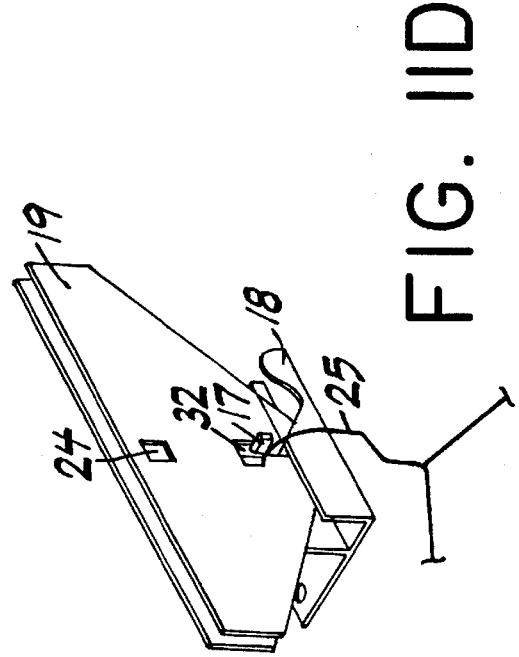
Figure 11D:
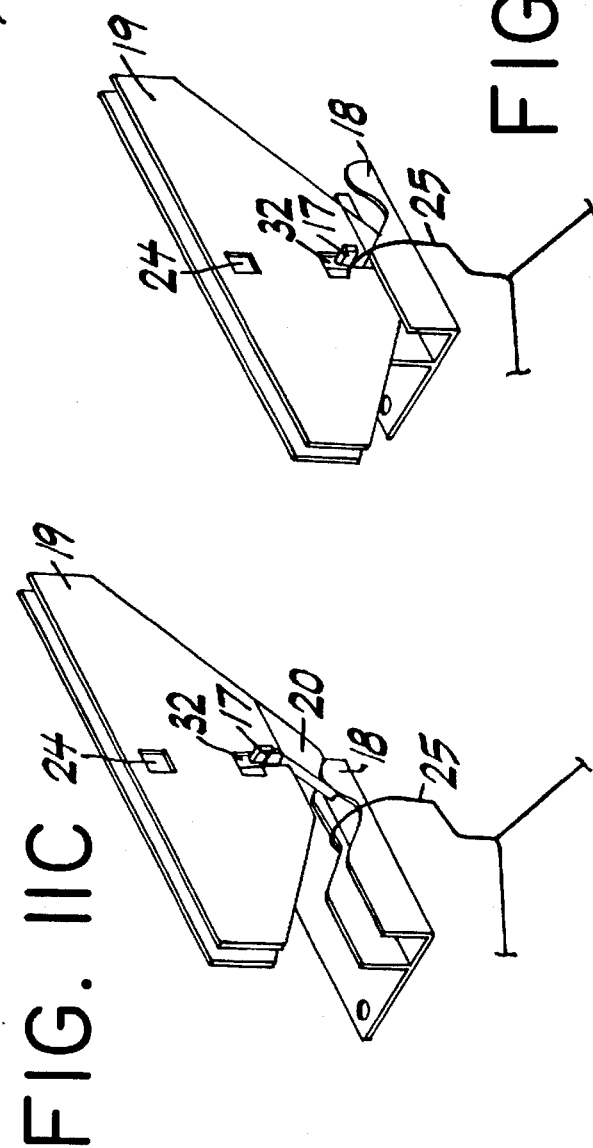

Once the hanger 25 is in place on the load ramp 18, as shown in FIG. 11b, the empty carrier 19 approaching on the conveyor picks up the hanger 25, as shown in FIGS. 11c–11d. The load ramp has two parallel metal sides over which the hanger 25 rests. The pusher 20 on the carrier slides between these metal sides and encourages the hanger 25 up the load ramp 18 and into the latch 17. The motion of the carrier 19 in interaction with the load ramp 18 pushes the hanger 25 up the load ramp 18 and forces the latch 17 open. The hanger 25 then passes past the latch 17 and into the opening 32 where the hanger 25 rests on the carrier 19 while on the conveyor 5.

SINGLE LATCH CARRIER

Figure 10:
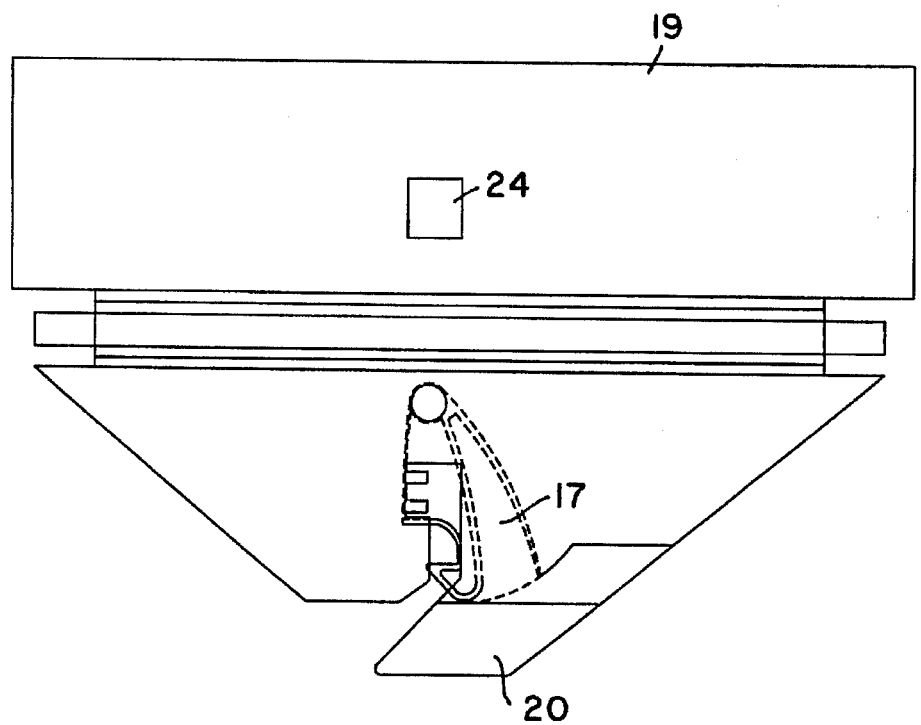
FIG. 10 depicts one embodiment of the single latch carrier of the present invention.

The single latch carrier 19 depicted in FIG. 10 uses the same latch mechanism 17 as the five latch carrier disclosed in the above mentioned patents and has the same relationship between the window 24 and the latch 17, however, the bottom portion is quite different. In addition, the carrier 19 has a pusher appendage 20 which engages the hanger 25 as it rests on the load ramp 18 pushing the hanger up the load ramp 18 and forcing the hanger to latch positively into position, as depicted in FIGS. 11a–11d.

TIMING

The sensors 6, 7, 8 and 23 of the loader 4 are polled at a regular interval, preferably at 4 milliseconds (0.004 seconds), producing a polling rate of 250 cycles per second. The data from these sensors 6, 7, 8 and 23 is used to coordinate the operation of the loader 4.

At each poll interval, the conveyor position is updated based on the status of the conveyor position sensor 6. As the position is updated, a load window timer for each loader 4 is started and the availability of conveyor locations for garments are checked. The load window timer indicates a time interval during which a garment may be successfully loaded onto the conveyor 5. Depending on the occupancy of the conveyor 5 and availability of garments, the load arm 15 is retracted or extended as needed. Sensor inputs are used to update variables which indicate the status of garments in the load queue.

DEBOUNCE TIMER

Several timers which do not strictly depend upon the poll cycle are used to further coordinate the operation of the loader 4. A primary metering device sensor debounce timer is used to avoid a false indication from vibration caused when a garment enters or exits the sensor's monitored area. To avoid indicating a false detection of a garment, the interval on this timer must elapse before a garment is considered being present. The elapsed time is approximately equal to the time required for the vibration to damp out below the threshold for producing a false reading from the sensor. Preferably, the length of this period is about 1 second, however, the actual value will vary from system to system depending upon several factors, such as the weight of the garments and the materials used. Consequently, the length of the debounce period is best set after experience with each system.

LOAD WINDOW START AND STOP TIMER

A load window start timer and stop timer defines a time window during which a garment may be released from the secondary hanger metering device 10 so that the garment will correctly load on the conveyor 5. Referring to FIGS. 11a–11d, the garment 25 must be released by the secondary air cylinder 12 so that the garment reaches the load ramp 18 after the previous carrier has passed but before the approaching carrier reaches the load ramp 18. The load window start timer and stop timer ensures that this coordination is possible. The conveyor position sensor 6 notes the approach of a carrier 19. Based on previous information, the computer knows whether the approaching carrier is occupied or not, i.e., the loader 4 that loaded the particular carrier approaching updates a conveyor map to indicate that this carrier 19 is occupied. Thus, the start and stop time is based on data output from the conveyor position sensor 6. In addition, the proximity garment loaded sensor 23 detects the presence of a garment on the carrier 19 after it has passed the loader 4. Since the computer 33 knows whether the carrier 19 was empty when reaching the loader 4, and the garment loaded sensor 23 detects whether the carrier is full after passing the loader 4, the system can determine that a garment was successfully loaded on the carrier 19.

Figure 12:
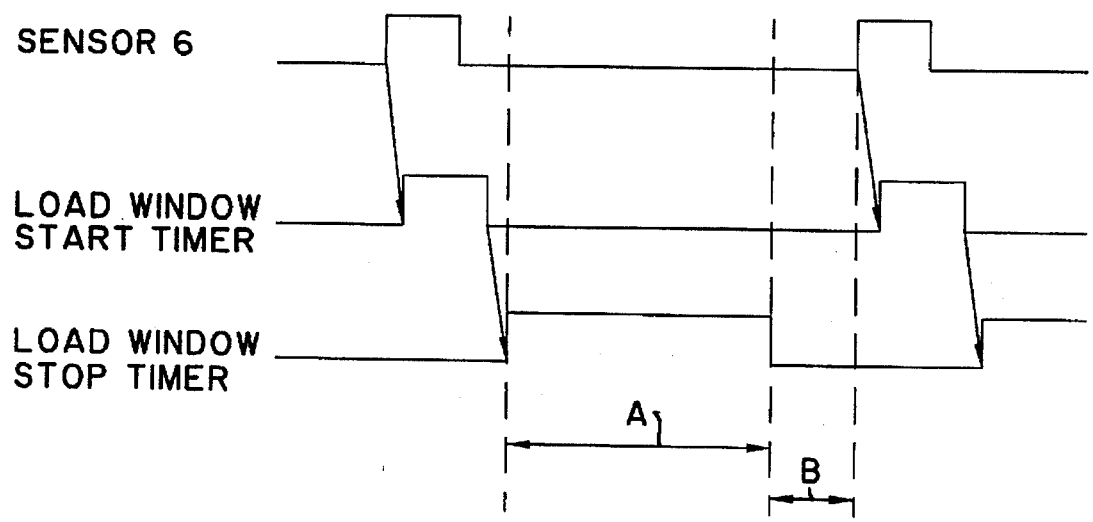
FIG. 12 depicts a timing diagram illustrating sensor timing according to the present invention.

As shown in FIG. 12, the load window start timer is set when the conveyor position sensor 6 detects the passing carrier. When the load window start timer is reset, the load window stop timer is set. A garment can be released for loading any time during the time interval A when the load window stop timer is set. The load window stop timer is reset at a determined time after which a released garment would not reach the loader in time for loading. In other words, if a garment is released during the time interval B, the garment would not reach the loader before the next carrier arrives at the loader.

PRIMARY METERING DEVICE TIMER

A primary metering device release timer counts down a time-out interval which is used to determine if a garment was successfully released from the primary metering device 11. If the timer elapses before a garment is sensed by the garment staged sensor 7, another garment is released by the primary metering device 11. Preferably, the length of this period is i second.

FALL TIMER

A fall timer allows a garment to slide from the field of the garment staged sensor 7 to the secondary hanger metering device 10. When this timer has elapsed, a garment is ready to be released into the conveyor 5. Preferably the length of this period is 0.5 seconds.

SYSTEM OPERATION

When the primary metering device debounce timer expires, it is turned off and the primary metering device 11 is checked for the availability of a garment ready to be released. A garment is available to be released if: (1) the loader 4 is enabled; (2) the conveyor 5 is not full; (3) the signal from the garment queued sensor 8 is still on; and (4) there are no garments currently in the loader 4 (i.e., the loader rail 9 is clear, no garment is ready to load, and no garment is moving from the primary metering device 11 to the secondary hanger metering device 10).

If a garment can be released, the release output signal is pulsed and the primary metering device timer is started. The release output signal will extend the primary metering device cylinder 13, and retract the secondary hanger metering device cylinder 12 for a short duration. Then, it will retract the primary metering device cylinder 13 while extending the secondary hanger metering device cylinder 12. When the primary metering device cylinder 13 is retracted a garment is released from the primary metering device cylinder 13 to the secondary metering device cylinder 12.

When the load window start timer expires, the timer is turned off and the loader 4 is checked for a garment available for loading. A garment is available for loading if the loader 4 is enabled, the load ramp 18 is empty and a garment is ready at the secondary hanger metering device 10.

If a garment is available for loading and the conveyor 5 is full, the release output signal is turned on (not pulsed). In this case, the release output signal is activated and remains active to hold the garment in the primary metering device. The signal will retract the secondary hanger metering device 10 allowing the garment to slide to the load arm 15. The primary metering device cylinder 13 is extended advancing a garment, if present, into the primary metering device 11 and holding it there. The primary metering device timer is then turned off.

If a garment is available for loading and the conveyor 5 is not full, the release output signal is pulsed. When the signal turns on, the secondary hanger metering device 10 retracts allowing the garment to slide down the load arm 15 to the load ramp 18 and the primary metering device cylinder 13 is extended advancing a garment, if present into the primary metering device 11. At the end of the pulse, the secondary hanger metering device 10 extends and the primary metering device cylinder 13 retracts allowing the garment, if present, to slide from the primary metering device 11 to the secondary hanger metering device 10. If a garment was in the primary metering device 11, the primary metering device timer is started.

If a garment cannot be loaded, the load window end timer is started. If a garment becomes ready to load while the end timer is running, it is loaded. When the load window end timer expires, the timer is turned off.

The fall timer is started by the sensing of a garment by the garment staged sensor 7. When the fall timer expires, the timer is turned off and the availability of a garment to be loaded is checked. A garment is available to be loaded if the conveyor 5 is enabled, the load ramp 18 is empty and the load window end timer is running.

If a garment is available for loading and the conveyor 5 is full, the release output signal is turned on (not pulsed). As before, the release output signal is activated and remains active to hold the garment in the primary metering device. The signal will retract the secondary hanger metering device 10 allowing the garment to slide down the load arm 15 to the load ramp 18. The primary metering device cylinder 13 is extended advancing a garment, if present, into the primary metering device 11 and holding it there. The primary metering device timer is then turned off.

If a garment is available for loading and the conveyor 5 is not full, the release output signal is pulsed. When the signal turns is pulsed, the secondary hanger metering device 10 retracts allowing the garment to slide down the load arm 15 to the load ramp 18 and the primary metering device cylinder 13 is extended advancing a garment, if present into the primary metering device 11. At the end of the pulse, the secondary hanger metering device 10 extends and the primary metering device cylinder 13 retracts allowing the garment, if present, to slide from the primary metering device 11 to the garment staging cylinder 12. If a garment was in the primary metering device 11, the primary metering device timer is started.

If a garment was loaded, the load window end timer is turned off, the load ramp 18 is marked as full, and it is noted that no garment is ready to be loaded. If a garment was not available to be loaded, it is noted that a garment is ready to load.

When the primary metering device timer expires, the availability of another garment to be loaded from the primary metering device 11 is checked. The timer will expire only when a garment is attempted to be released from the primary metering device 11 and the garment is not sensed with the garment staged sensor 7. This timer allows for the misfire of the primary metering device 11.

If no garment is ready to load, the load rail 9 is clear, the loader 4 is enabled and there is still a garment sensed by the garment queued sensor 8, the release output signal is pulsed. When the release output signal is pulsed, the secondary hanger metering device 10 retracts allowing the garment to slide down the load arm 15 to the load ramp 18 and the primary metering device cylinder 13 is extended advancing a garment, if present into the primary metering device 11. At the end of the pulse, the secondary hanger metering device 10 extends and the primary metering device cylinder 13 retracts allowing the garment, if present, to slide from the primary metering device 10 to the secondary hanger metering device 11. Next, the primary metering device timer is restarted.

If a garment cannot be loaded, the primary metering device timer is turned off. If there is no garment ready or sliding to the secondary hanger metering device 10 and the load ramp 18 is empty, the load arm 15 is retracted.

The loader code module 2 is also monitoring commands from the Sort Control module 1 which enable and disable the loader 4 as well as provide updates to the status of the conveyor map so the loader 4 knows where garments may be loaded on the conveyor 5.

Figure 4A:
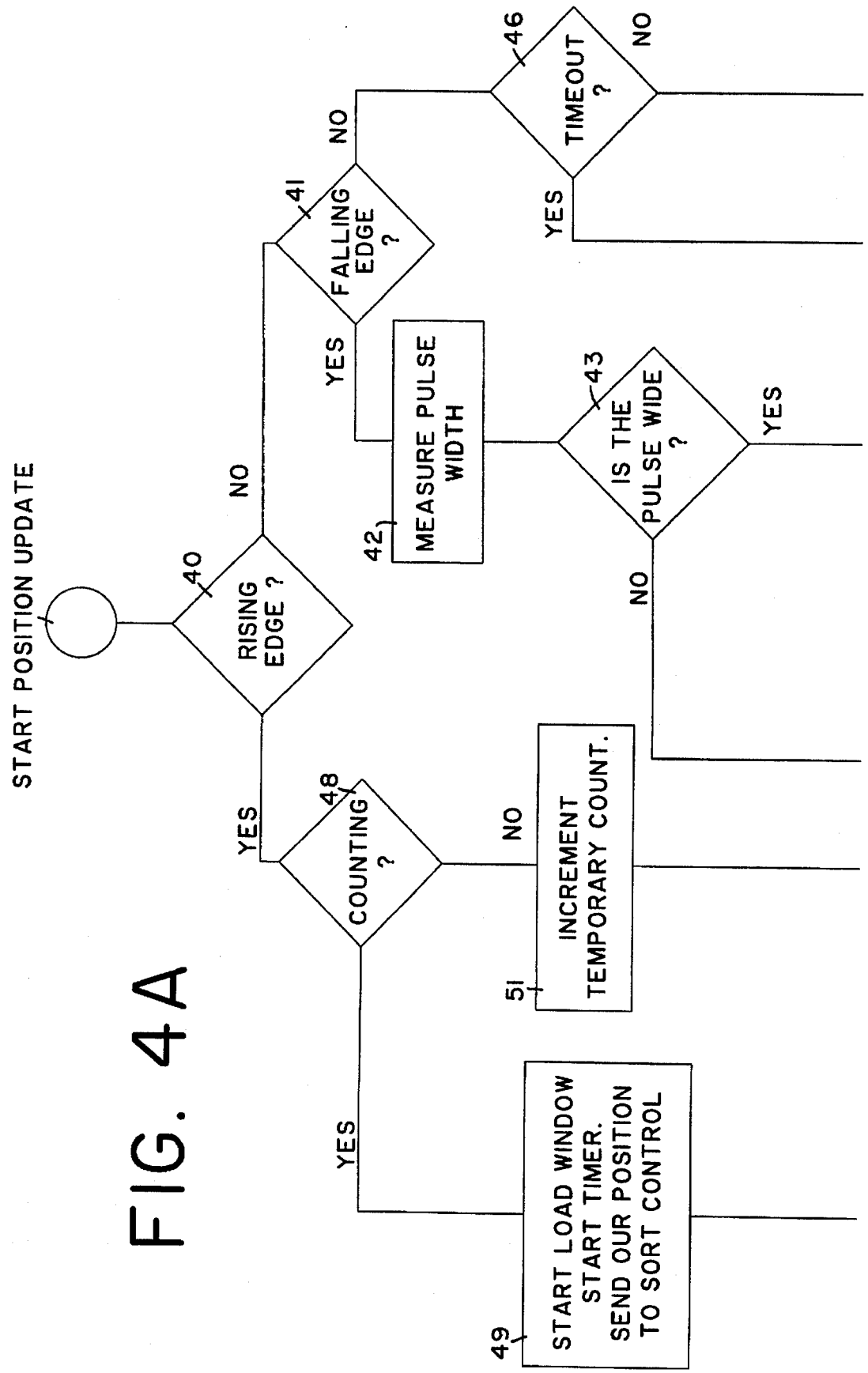
FIG. 4 depicts a flow chart showing the logic implemented by the software of the control system in updating the position of the conveyor relative to the loader.
Figures 4, 4B:
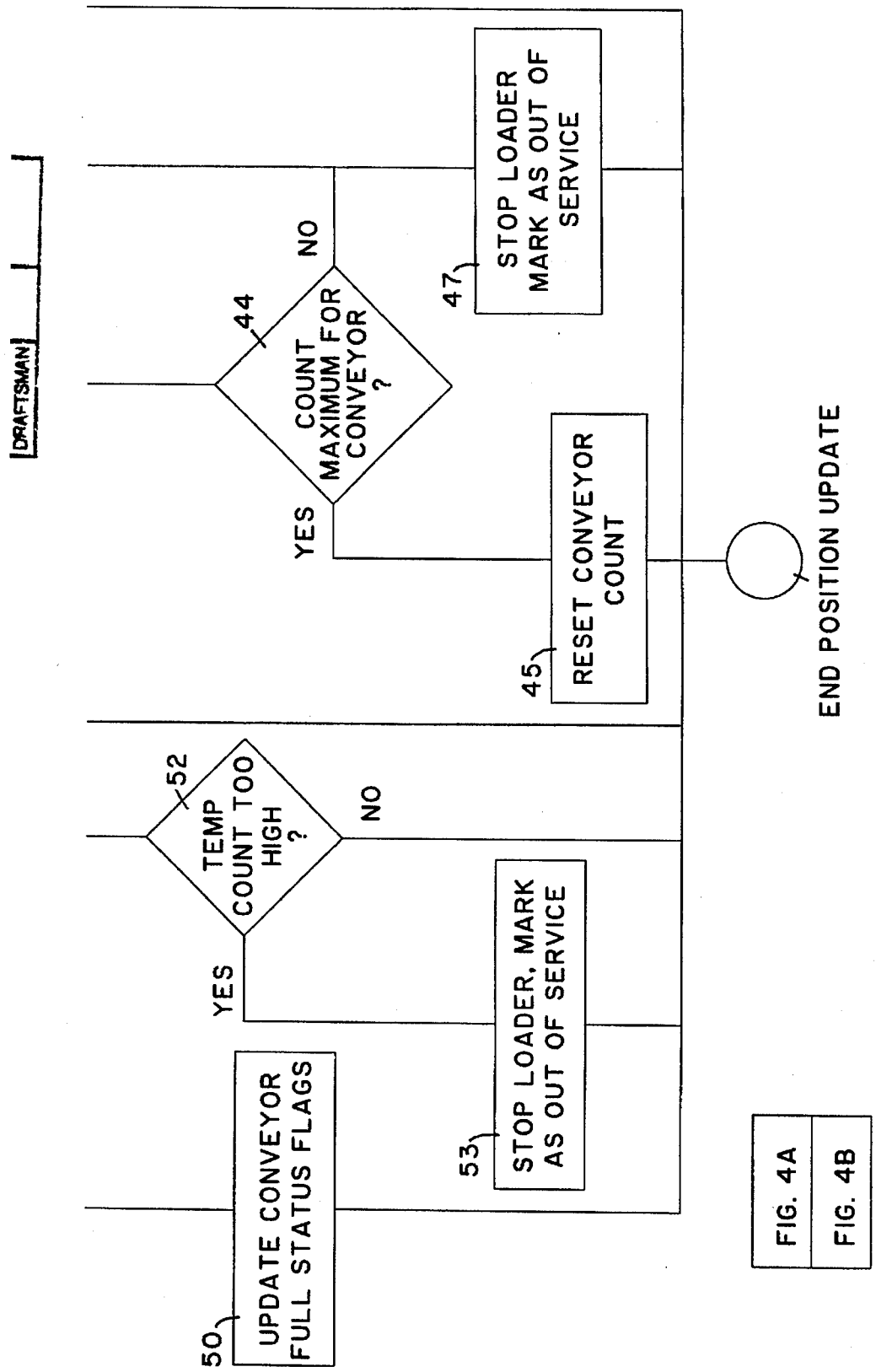
Figure 6:
FIG. 6 depicts the electrical signal generated by the apparatus of the present invention to update the position of the conveyor relative to the loader.

FIG. 4 depicts the conveyor position update logic, which is based on the expected sequence of pulses received from the conveyor position sensor 6. As shown in FIG. 6, the pulse sequence consists of a series of shorter pulses, one for each conveyor position. One pulse per conveyor revolution will be at least twice as long as the other pulses indicating the last position on the conveyor 5. Each loader control module 2 is aware of the maximum number of positions on the conveyor 5 and so can verify the accuracy of the functioning of the position sensor 6 whenever the last position is sensed. By increasing the size of the window 24 (see FIG. 10) in one of the carriers, the resulting pulse width from the sensor 6 when sensing that carrier will be longer than the pulse width resulting from the sensing of any other carrier 19. Typically, the window 24 in the reference carrier will be about 2½ times the size of the windows 24 in the other carriers, which results in the sensor 6 outputting a wide pulse width every cycle of the conveyor 5.

The counting logic always stores the previous state of the position sensor 6 output, high or low (see FIG. 6). This is used to determine if the position sensor 6 value has just changed from low to high or vice versa.

At the beginning of the conveyor position update process, the sensor's state will either change from low to high, from high to low, or remain the same. If it remains the same for a predetermined interval of time, it is not detecting passing conveyor positions, and the loader 4 will be stopped and marked out of service.

If the sensor state changes from high to low, (i.e., the decision at decision point 40 is NO and the decision at decision point 41 is YES) the pulse width will be measured, as shown in functional element 42. Upon encountering a wide pulse (i.e., decision point 43 is YES), which marks the beginning (or reference point) of the conveyor 5, the pulse count will be compared with the known maximum count for the conveyor 5, as shown in decision element 44. If the counts match (i.e., the decision from decision element 44 is YES), the conveyor pulse count will be reset to zero, as shown in functional element 45, marking the beginning of another cycle of the conveyor 5. If the counts do not match (i.e., the decision from decision element 44 is NO), the loader 4 will be stopped and marked as out of service, as indicated by functional element 47. A mismatch could mean a malfunctioning position sensor 6. As shown in FIG 4, if neither a rising edge is detected (decision element 40 is NO) nor a falling edge is detected (decision element 41 is NO), then the signal has remained the same, and if it remains the same for the predetermined time interval, i.e., decision element 46 is YES, then the loader is stopped and marked as out of service, as indicated in functional element 47. If the timeout has not occurred, then the position update ends.

If the sensor state changes from low to high (decision element 40 is YES) and the loader 4 is tracking conveyor positions by counting (decision element 48 is YES), the pulse will be counted, the load window start timer is started, and the conveyor position is transmitted to the sort control module 1, as indicated in functional element 49. Conveyor full flags are updated in functional element 50.

The load window is the time when a garment may be released from the secondary hanger metering device 10 to be loaded. It starts shortly after the position is sensed by the conveyor position sensor 6 and lasts for the majority of the time required for the conveyor 5 to move to the next latch location. The time is set so that the garment released will be on the load ramp 18 before the pusher on the conveyor 5 reaches the loader rail 9. The timer ensures the hanger reaches the loader rail 9 synchronized to the conveyor position.

If the loader 4 is not tracking conveyor positions by counting (decision element 48 is NO), the temporary count is incremented in functional element 51. If the temporary count exceeds the known maximum count for the conveyor 5 (decision element 52 is YES), the position sensor 6 is not operating correctly, and the loader 4 will be stopped and marked out of service, as in functional element 53. If not, the position update ends.

Figure 5:
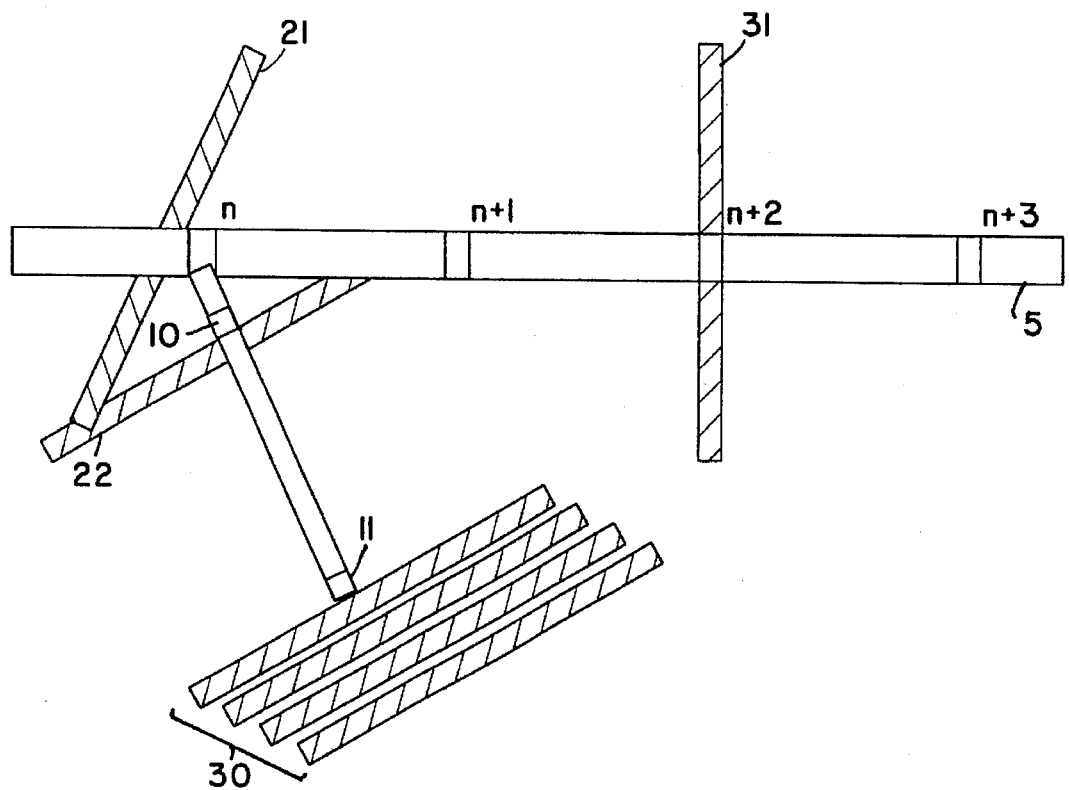
FIG. 5 depicts the loading of garments onto the conveyor in accordance with the method of the present invention.

Once the timers have been started and the conveyor position updated, the status of the conveyor 5 is checked to determine whether the conveyor 5 is full. As depicted in FIG. 5, the loader 4 may have two garments 21 and 22 in locations which will interfere with garments On the conveyor 5.

When the conveyor location n is sensed by the conveyor position sensor 6, one garment 21 may be in position on the load ramp 18 and a second garment 22 may be held at the secondary hanger metering device 10. Several other garments 30 are loaded in the queue at the primary metering device 11. The garment 21 on the load ramp 18 will be loaded into conveyor location n, and the garment 22 at the secondary staging cylinder 10 will be loaded into conveyor location n+1. To avoid releasing any more garments which would interfere with garments already on the conveyor 5 (e.g., the garment 31 at position n+2 in FIG. 5), none of the garments 30 held by the primary metering device 11 can be released if conveyor position n+2 or n+3 are occupied.

If position n+2 or n+3 is occupied, the conveyor 5 is marked as "full" so no more garments 30 in the queue will be released from the primary metering device 11. If conveyor position n+1 is also occupied, the conveyor 5 is marked as "very full". This marking of the conveyor 5 as "very full" will automatically pause the loading process, which prevents a hanger from being loaded in the portion of the loader between the primary 11 and secondary 10 metering devices.

Figure 7:
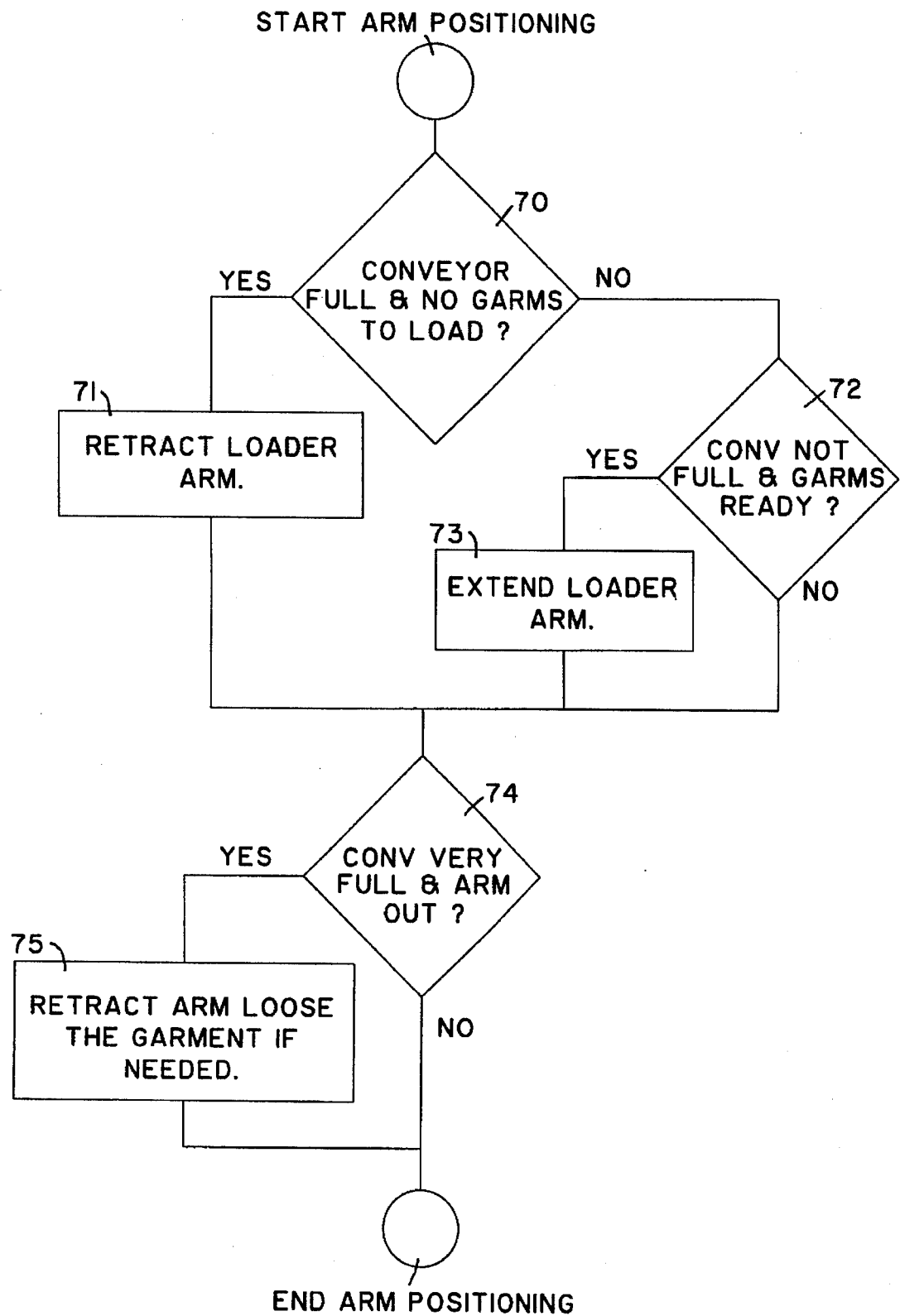
FIG. 7 depicts a flow chart showing the logic implemented by the software of the control system in positioning the loader arm of the present invention.

FIG. 7 depicts the load arm positioning logic, which clears the conveyor path when possible to allow garments on the conveyor 5 to pass unimpeded. If the conveyor 5 is "full" and there are no garments in position to block garments on the conveyor 5 (decision element 70 is YES) the loader arm 15 is retracted, as indicated in functional element 71. A garment is considered as being in position to interfere with garments on the conveyor 5 either if it is on the load ramp 18, or it is ready to be loaded at the secondary hanger metering device 10, or it is released from the primary metering device 11.

If the decision at decision element 70 is NO, i.e., either the conveyor is not "full' or no garments are ready to load. Then it is determined whether the conveyor is not "full" and garments are ready to load, as indicated in decision element 72.

If the conveyor is not "full" and a garment is ready to load either in the primary metering device 11 or at the secondary hanger metering device 10 (decision element 72 is YES) and the loader arm 15 is currently retracted then the loader arm 15 is extended, as indicated in functional element 73. If the answer at decision element 72 is NO, then whether the conveyor is "very full" is tested at decision element 74.

If the conveyor 5 is "very full" (YES at element 74) and the loader arm 15 is extended, the loader arm 15 is retracted, as indicated in functional element 75. A garment may be lost at this time, which is noted by the computer 33. If the answer is NO, then positioning of the loader arm 15 is ended.

Figure 8:
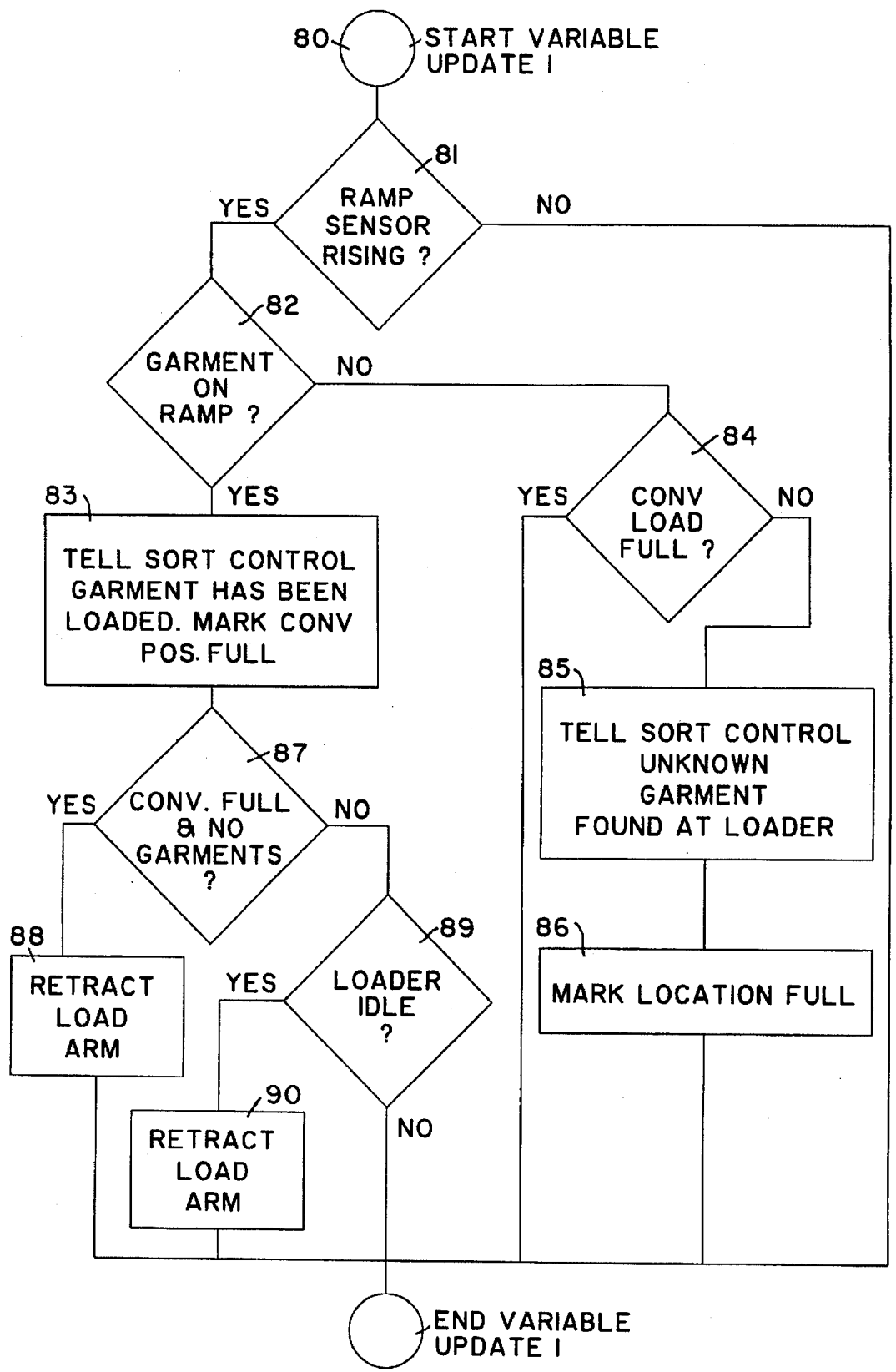
FIGS. 8 and 9 depict flow charts showing the logic implemented by the software of the control system in updating sensor-monitored variables important for the proper operation of the present invention.

The update flow of the variables that reflect the status of the conveyor 5 is depicted in FIG. 8. This update of the variables that reflect the status of the conveyor 5 and loader 4 is done in three stages. The first stage takes place when the garment loaded sensor 23 changes from a low to a high state (element 81). A rising state in the garment loaded sensor 23 indicates that a hanger has passed the exit point of the load ramp 18. This is an indication that the load ramp 18 is now empty and can receive another hanger from the secondary hanger metering device 10. When the sensor state rises, the load ramp 18 is checked for a garment. If a garment is on the load ramp 18, then the conveyor position it was loaded to is transmitted to the sort control module 1, and that location on the conveyor 5 is marked as full (element 83). The load ramp 18 is then marked as empty (element 83). If a garment is not on the load ramp 18, the list of loaded conveyor positions is checked. If the conveyor position is full (YES at element 84), the garment the sensor is detecting was loaded by another loader. If the conveyor location is empty (NO at element 84), the sort control module is updated that a garment with an unknown origin was sensed on the load ramp 18 (element 85) and the location is marked as full (element 86). If the state of the garment loaded sensor 23 has not changed from low to high, the second stage is entered, which is depicted in FIG. 9.

If the conveyor 5 is full and no garments are in position to be loaded (YES at element 87), the loader arm 15 is retracted (element 88). If the loader 4 is idle (YES at element 89) and has no garments on it at all, the loader arm 15 is retracted (element 90). If NO at element 89, variable update 1 is ended.

Figure 9:
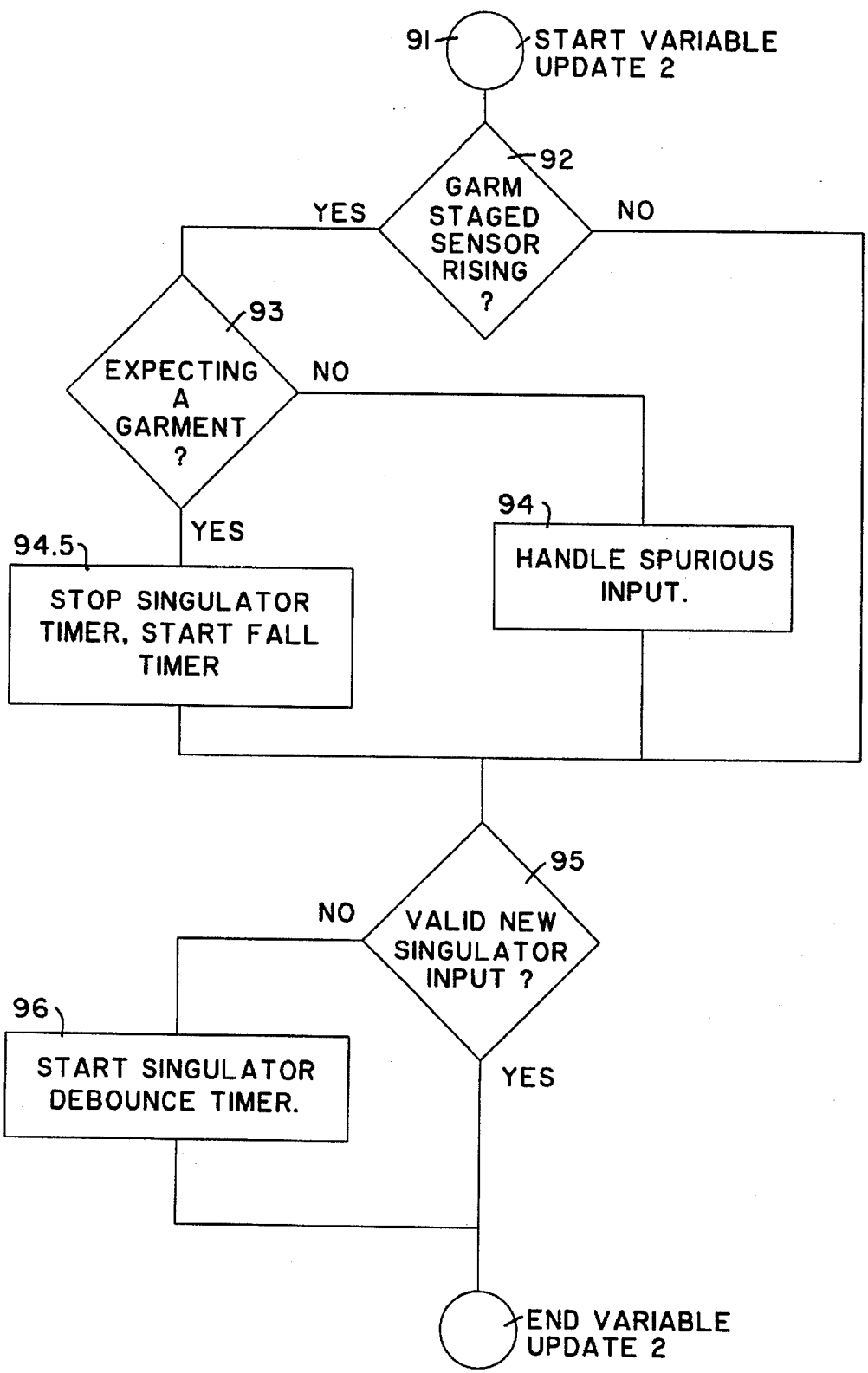

As shown in FIG. 9, the second stage 91 takes place when the garment staged sensor 7 changes from a low to a high state (YES at element 92). Such a change indicates that a hanger has been sensed falling to the secondary hanger metering device 10. If a garment is not expected (NO at element 93), the status changed is marked as spurious input (element 94). The input is expected to rise only when the primary metering device timer and the fall timer are running. If a garment is expected, the primary metering device timer is stopped and the fall timer is started (element 94.5).

The third stage takes place when the state of the garment queued sensor 8 changes. This sensor 8 has an unstable output and is only checked when the primary metering device debounce timer is not running. If the primary metering device debounce timer is not running, and the garment queued sensor 8 output signal is rising or the signal is high and no garments are in the loader 4, the primary metering device debounce timer is started (element 96) to allow the signal to stabilize.

The variables updated by the above process are monitored by the sort control module 1, which controls each loader 4 through simple commands. The commands enable and disable the loader 4 and inform the loader 4 when a conveyor position has been filled or emptied.

When a message is received disabling the loader 4, the disabled status of the loader 4 is noted. This will prevent any more garments from being loaded.

When a message is received enabling the loader 4, the primary metering device 11 is checked to see if a garment can be released to resume loading. A garment can be released if the conveyor 5 is not full, and either a garment is ready to be loaded and the load window end timer is running and the load ramp 18 is empty, or the loader 4 has no garments and there is a garment in the primary metering device 11.

If a garment can be released, the release output signal is pulsed. When the signal is pulsed, the secondary hanger metering device 10 retracts allowing the garment to slide down the load arm 15 to the load ramp 18 and the primary metering device cylinder 13 is extended advancing a garment, if present into the primary metering device 11. At the end of the pulse, the secondary hanger metering device 10 extends and the primary metering device cylinder 13 retracts allowing the garment, if present, to slide from the primary metering device 11 to the garment staging cylinder 12. If a garment was in the primary metering device 11, the primary metering device timer is started. The load window end timer is started, and the load ramp 18 is marked as full if there was a garment ready at the secondary hanger metering device 10. It is noted that no garment is now ready to load.

CONVEYOR MAP

A conveyor map stores data that reflects full and empty positions on the conveyor. It is used to automatically pause the loading process when previously loaded garments approach the loader. When a message is received marking a conveyor location as full, the location on the local copy of the conveyor map is marked as full. When a message is received marking a conveyor location as empty, the location on the local copy of the conveyor map for that location is marked as available.

To pause the loader 4, the computer simply returns the primary air cylinder to the extended position and retracts the secondary air cylinder, and retracts the loader arm 15. This clears the loader rail 9, if any garments were in transit to the loader ramp 18, i.e., these garments fall off the loader rail 9. Garments are thus also prevented from passing the primary metering device 11.

While the present invention has been described with reference to a conveyor and loader for transporting garments, certain features of the present invention such as the dual metering approach are applicable to any conveyor system in which the supply of articles to be conveyed must be maintained at a distance, yet efficiency considerations require loading the conveyor with the articles from a closer distance. The present invention provides the ability to pre-load the loader with articles so that when empty conveyor positions approach the loader, articles can be loaded in every empty position. Yet when occupied conveyor positions approach the loader, the loader can be easily cleared to prevent any interference from occurring between the previously loaded articles and the articles in the loader.

What is claimed is:

1. An apparatus for loading a plurality of articles, each of which are supported on a hooked member, on a conveyor having a plurality of carriers for transporting these hooked members, comprising:

a) a loader on which the hooked members travel from a queuing location to the conveyor;

b) a primary metering device being mounted on the loader and selecting one hooked member at a time from a queue of hooked members and releasing the one hooked member at a first predetermined time so that the one hooked member travels on the loader toward the conveyor;

c) a secondary metering device being mounted on the loader between the primary metering device and the conveyor, blocking the one hooked member from traveling one the loader to the conveyor, and releasing the one hooked member at a second predetermined time so that the one hooked member travels on the loader to the conveyor; and d) a controller being coupled to the primary and secondary metering devices and coordinating operations of the primary and secondary metering devices so that the secondary metering device releases a first hooked member to the conveyor as a second hooked member passes from the primary metering device to the secondary metering device, while yet a third hooked member passes into the primary metering device, and then the secondary metering device blocks access to the conveying device before the second hooked member reaches the secondary metering device.

2. The apparatus according to claim 1, further comprising:
   a) a first buffer disposed on a side of the primary metering device farthest away from the conveyor, and being capable of holding a plurality of hooked members therein;
   b) a second buffer being disposed between the primary metering device and the secondary metering device and holding a single hooked member; and
   c) a third buffer being disposed between the secondary metering device and the conveyor and holding a single hooked member disposed.

3. The apparatus according to claim 1, further comprising:
   a) a first sensor coupled to the controller for sensing a hooked member entering the primary metering device; and
   b) a second sensor coupled to the controller for sensing a hooked member entering the secondary metering device.

4. The apparatus according to claim 1, further comprising a conveyor sensor sensing a position of the conveyor as it passes the conveyor sensor, wherein said conveyor sensor is coupled to the controller.

5. The apparatus according to claim 4, wherein the controller further comprises a memory in which a conveyor map is stored, the conveyor map indicating full and empty locations on the conveyor, the controller controlling the primary and secondary metering devices so that hooked members are in place in the primary and secondary metering devices when empty locations on the conveyor pass the loader, whereby each empty location is loaded with a hooked member.

6. The apparatus according to claim 5, wherein the controller controls the primary and secondary metering devices so that when articles on the conveyor pass the loader, hooked members are not located in places on the loader that would interfere with the articles as they pass the loader.

7. The apparatus according to claim 3, further comprising a debounce timer being coupled to the first and second sensors, and clocking an interval during which outputs from the first and second sensors are inhibited to prevent false sensing indications due to vibrations by moving articles.

8. The apparatus according to claim 1, further comprising a sensor for detecting an article on a carrier after the article exits the loader.

9. An apparatus for loading a plurality of articles, each of which are supported on a hooked member, on a conveyor having a plurality of carriers for transporting these hooked members, comprising:
   a) a loader on which the hooked members travel from a queuing location to the conveyor;
   b) a primary metering device being mounted on the loader and selecting one hooked member at a time from a queue of hooked members and releasing the one hooked member at a first predetermined time so that the one hooked member travels on the loader toward the conveyor; and
   c) a secondary metering device being mounted on the loader between the primary metering device and the conveyor, blocking the one hooked member from traveling one the loader to the conveyor, and releasing the one hooked member at a second predetermined time so that the one hooked member travels on the loader to the conveyor;
   wherein the loader comprises a tube with a slot at the primary metering device location, and the primary metering device comprises:
   a spring loaded cam disposed in the tube which extends through the slot in the tube; and
   a first air cylinder which in one position extends to contact the cam forcing the cam into the slot, and in another position retracts which allows the cam to jut outside the tube.

10. The apparatus according to claim 9, wherein the secondary metering device further comprises a second air cylinder which in a first position extends and contacts the tube and in a second position retracts.

11. The apparatus according to claim 10, further comprising a common air solenoid, wherein the first and second air cylinders work in reciprocal fashion off the common air solenoid.

12. The apparatus according to claim 9, wherein the primary metering device further comprises means for selecting one hooked member from the queue of hooked members.

13. The apparatus according to claim 12, wherein the means for selecting extends the first air cylinder to contact the cam and allow the one hooked member to travel past the cam to the first air cylinder.

14. The apparatus according to claim 12, wherein the primary metering device further comprises means for releasing a selected hooked member.

15. The apparatus according to claim 14, wherein the means for releasing retracts the first air cylinder, and causes the secondary metering device to block the selected hooked member from traveling on the loader by extending the second air cylinder in synchronization with retraction of the primary air cylinder.

16. An apparatus for loading a plurality of articles, each of which are supported on a hooked member, on a conveyor having a plurality of carriers for transporting these hooked members, comprising:
   a) a loader on which the hooked members travel from a queuing location to the conveyor;
   b) a primary metering device being mounted on the loader and selecting one hooked member at a time from a queue of hooked members and releasing the one hooked member at a first predetermined time so that the one hooked member travels on the loader toward the conveyor;
   c) a secondary metering device being mounted on the loader between the primary metering device and the conveyor, blocking the one hooked member from traveling one the loader to the conveyor, and releasing the one hooked member at a second predetermined time so that the one hooked member travels on the loader to the conveyor; and
   (d) a loader arm being extendable from the loader to the conveyor, wherein the loader arm in one position extends to permit a hooked member to travel from the loader to the conveyor and in another position retracts to permit articles traveling on the conveyor to pass by the loader unimpeded.

17. The apparatus according to claim 16, further comprising a load ramp being disposed in a path of the conveyor and being in contact with the loader arm when the loader arm is extended from the loader, wherein said load ramp receives a hooked member released from the loader by the secondary metering device, orients the hooked member to be in line with other hooked members carried by the conveyor and holds the hooked member until a carrier from the conveyor picks up the hooked member.

18. A method for loading articles supported on hooked members on a conveyor having a plurality of defined positions for carrying articles, the method comprising the steps of:

a) selecting one article at a time from a plurality of articles;
   b) releasing the one article at a first predetermined time for loading on the conveyor;
   c) blocking further access by the one article to the conveyor at the first predetermined time;
   d) releasing the one article to the conveyor at a second predetermined time;
   e) determining a presence or absence of hooked articles on the locations on the conveyor;
   f) preloading a loader disposed near the conveyor with a hooked member so that when an empty location approaches the loader, the hooked member is ready for loading on the conveyor; and
   g) inhibiting loading of the loader with a hooked member when a location occupied with an article approaches the loader so that the movement of the article is not impeded by a hooked member.

19. The method according to claim 18, further comprising the step of:

h) selecting a second article from the plurality of articles at the second predetermined time.

20. The method according to claim 18, further comprising the steps of:

h) storing an occupied status of the conveyor;
   i) determining whether the presence or absence of hooked articles determined in step e) agrees with the occupied status stored in step h); and
   j) updating the occupied status of the conveyor when either a discrepancy is determined in step i) or a hooked article is loaded in step d).

21. The method according to claim 20, further comprising the step of:

k) dropping an article from the loader when it appears the article will interfere with an article on the conveyor; and
   l) storing information regarding the article that was dropped in step k).

22. An apparatus for facilitating a transfer of a hooked member to a carrier, comprising:

a) a plate having a pair of spaced apart fin portions defining a gap therebetween and also defining a notch for receipt of a hooked member, one of the fin portions having an arcuate edge to facilitate an orientation and transfer of a hooked member onto the notch; and
   b) a ramp adjacent to the notch.

23. A method for loading articles onto a moving carrier comprising the steps of:

a) maintaining a plurality of articles in a first buffer located at a distance from the moving carrier sufficient to prevent interference between the plurality of articles and articles already loaded on the carrier;
   b) releasing one of the plurality of articles to a second buffer from the first buffer when an empty location on the carrier is detected; and
   c) releasing the one of the plurality of articles to a third buffer for loading in synchronization with a passing empty carrier.

24. A method for loading garments onto a moving conveyor with a plurality of carriers, comprising the steps of:

a) determining whether at least the next two carriers on the conveyor approaching a loader are occupied with garments;
   b) monitoring a primary metering device to determine whether a garment is available for loading; and
   c) releasing a first garment from the primary metering device down the loader and then immediately blocking any remaining garments when a garment is available for loading, the conveyor status is not full or very full, and no garments are in the loader, wherein the conveyor status is full whenever the first of the next two carriers is vacant and the second of the next two carriers is occupied, and the conveyor status is very full when both the first and second of the next two carriers are occupied.

25. The method according to claim 24, further comprising the steps of:

d) blocking the first garment at a secondary metering device until an empty carrier approaches;
   g) initiating a load window timer when data from the plurality of sensors indicates a garment located at the secondary metering device will correctly load on an upcoming empty carrier;
   h) releasing the first garment from the secondary metering device when the load window time expires;
   j) turning on the primary metering device to select the first garment for loading and to hold the first garment in the primary metering device when the conveyor status is full; and
   k) releasing any garment in the secondary metering device when the conveyor status is full while simultaneously performing step j).

26. A method for loading articles on a conveyor comprising the steps of:

a) sensing empty conveyor positions approaching a loader;
   b) preloading the loader with an article for each empty conveyor position approaching the loader; and
   c) inhibiting loading of the loader when occupied conveyor positions approach the loader.

27. The method according to claim 26, further comprising the steps of:

d) maintaining a queue of articles at a distance from the conveyor to prevent interference with articles already loaded on the conveyor; and
   e) preloading only one article in the loader when only one of a first and second approaching conveyor position is empty.

28. The method according to claim 26 further comprising the step of:

d) pausing loading of conveyor positions until at least one of the two approaching conveyor positions are empty.

29. An apparatus for facilitating a transfer of a hooked member to a carrier having a spring loaded latch, comprising:

a) a plate having a pair of spaced apart fins defining a gap therebetween and also defining a notch for receipt of a hooked member;
   b) a loader rail spaced from the notch; and c) a selectively extendable loader arm coaxial with the loader rail, said loader rail and said loader arm, when extended, together defining a path for passage of a hooked member leading to the notch, wherein a shape of the fins in combination with a juxtaposition of the loader arm with respect to the fins is such that as a hooked member slides down the loader arm and makes contact with the fins, the hooked member rotates as it moves from the loader arm to a resting position in the notch of the fins.

30. The apparatus as set forth in claim 29, wherein one of the fins has an arcuate edge to facilitate the orientation and transfer of the hooked member onto the notch.

31. The apparatus as set forth in claim 29, wherein the fins define a ramp adjacent the notch.

32. The apparatus as set forth in claim 29, further comprising a carrier having a spring-loaded slot for receipt of a hooked member, and a depending pusher projecting below the slot of the carrier.

33. The apparatus as set forth in claim 32, wherein the pusher has a thickness that is less than the gap defined by the two fins so that at least a portion of the pusher can project into the gap defined by the two slots.

34. The apparatus as set forth in claim 33, wherein the pusher has a ramp so that when a hooked member is located in the notch defined by the fins, movement of the carrier through the gap between the fins causes the hooked member to ride up along the ramp of the pusher into the slot of the carrier to the extent that it engages the latch and is thereby secured to the carrier.

35. An apparatus for transporting garments supported on hangers, comprising:
   a) an endless conveyor having a plurality of carriers, each carrier having a spring-loaded latch for holding a hanger, and a pusher;
   b) at least one loader, each loader including:
      (i) a loader rail being mounted at an angle so that a first end disposed near the conveyor is lower than a second end disposed away from the conveyor;
      (ii) a primary metering device being disposed near the second end of the loader rail;
      (iii) a secondary metering device being disposed near the first end of the loader rail;
      (iv) a loader arm being mounted at the first end of the loader rail, the loader arm being extendable and retractable;
      (v) a load ramp being disposed beneath the conveyor, the load ramp having a valley in which a hanger can rest, having a ramp upon which the hanger resting in the valley rises when pushed by the pusher, which causes the hanger to latch into the latch on the carrier, wherein when the loader arm extends, the loader arm contacts the load ramp;
      (vi) a first sensor for sensing an approaching carrier; and
      (vii) a second sensor for sensing a hanger on the load ramp; and
   c) a controller being coupled to each loader, wherein the controller controls the primary and secondary metering devices and the loader arm to load hangers into empty carriers passing on the conveyor.

36. The apparatus according to claim 35, wherein the controller further comprises a processor disposed in each loader.

37. The apparatus according to claim 35, wherein the controller further comprises a memory in which a conveyor map is stored, the conveyor map indicating full and empty carriers on the conveyor.

38. The apparatus according to claim 37, wherein the controller updates the conveyor map based on information received from each loader indicating that a hanger was loaded on a particular carrier position.

* * * * *

UNITED STATES PATENT AND TRADEMARK OFFICE
CERTIFICATE OF CORRECTION

PATENT NO. : 5,660,261
DATED : August 26, 1997
INVENTOR(S) : Speckhart et al.

It is certified that error appears in the above-identified patent and that said Letters Patent is hereby corrected as shown below:

Column 8, line 2, change "Sort" to --sort--;
Column 12, line 67, change "i second" to --1 second--;
Column 16, line 9, change "garments On" to --garments on--;
Column 17, line 57, change "full, and" to --full and--.

Signed and Sealed this

Thirteenth Day of July, 1999

*Attest:*

Q. TODD DICKINSON

*Attesting Officer*   *Acting Commissioner of Patents and Trademarks*